US012769179B2

(12) United States Patent
Okawachi et al.

(10) Patent No.: US 12,769,179 B2
(45) Date of Patent: Oct. 20, 2026

(54) WAVELENGTH GENERATOR BASED ON RING RESONATOR PHOTONIC DEVICES

(71) Applicant: Xscape Photonics Inc., Fort Lee, NJ (US)

(72) Inventors: Yoshitomo Okawachi, River Edge, NJ (US); Asher Novick, Long Island City, NY (US); Samira Karimelahi, Los Gatos, CA (US); Alexander Gaeta, New York, NY (US); Vivek Raghunathan, Mountain View, CA (US)

(73) Assignee: Xscape Photonics Inc., Fort Lee, NJ (US)

( * ) Notice: Subject to any disclaimer, the term of this patent is extended or adjusted under 35 U.S.C. 154(b) by 402 days.

(21) Appl. No.: 18/460,477

(22) Filed: Sep. 1, 2023

(65) Prior Publication Data

US 2024/0272364 A1 Aug. 15, 2024

Related U.S. Application Data

(60) Provisional application No. 63/483,435, filed on Feb. 6, 2023.

(51) Int. Cl.
*G02F 1/39* (2006.01)
*G02B 6/12* (2006.01)
(Continued)

(52) U.S. Cl.
CPC ......... *G02F 1/392* (2021.01); *G02B 6/12007* (2013.01); *G02B 6/29338* (2013.01); (Continued)

(58) Field of Classification Search
CPC ............ G02B 6/29338; G02B 6/12007; G02B 6/29343; G02F 1/392; G02F 1/3546; G02F 1/395
See application file for complete search history.

(56) References Cited

U.S. PATENT DOCUMENTS 10,838,146 B2 11/2020 Trita
10,921,518 B2 2/2021 Barwicz
(Continued)

OTHER PUBLICATIONS

International Search Report and Written Opinion in International Appln. No. PCT/US2024/014614, mailed on Jul. 23, 2024, 12 pages.

(Continued)

*Primary Examiner* — Thomas A Hollweg
*Assistant Examiner* — Kirsten D. Endresen
(74) *Attorney, Agent, or Firm* — Fish & Richardson P.C.

(57) ABSTRACT

A device includes: a wavelength generator configured to output optical signals at a pump frequency and at first and second frequencies both different from the pump frequency, the wavelength generator including: a planar bus waveguide; a main ring resonator; a first heating element thermally coupled to the main ring resonator; an auxiliary ring resonator optically coupled to the main ring resonator; and a second heating element thermally coupled to the auxiliary ring resonator; and an electronic control module in communication with the first heating element and the second heating element, the electronic control module being programmed to control a detuning of a main ring resonance frequency from the pump signal frequency via the first heating element, and to control a spectral position of an auxiliary ring resonance frequency to produce optical signals at the first and second frequencies from the optical signal at the pump frequency.

19 Claims, 19 Drawing Sheets

(51) Int. Cl.
*G02B 6/293* (2006.01)
*G02F 1/35* (2006.01)

(52) U.S. Cl.
CPC ....... *G02B 6/29343* (2013.01); *G02F 1/3546* (2021.01); *G02F 1/395* (2013.01)

(56) References Cited

U.S. PATENT DOCUMENTS

| | | | | |
|---|---|---|---|---|
| 11,402,724 | B1 | 8/2022 | Blanco-Redondo et al. | |
| 11,693,184 | B2 | 7/2023 | Bian et al. | |
| 2014/0193155 | A1* | 7/2014 | Popovic .................. | G02F 1/395 29/428 |
| 2021/0373362 | A1* | 12/2021 | Okawachi ............... | H01S 5/005 |
| 2022/0229346 | A1* | 7/2022 | Blanco-Redondo ......................... | G02B 6/12007 |
| 2022/0299839 | A1 | 9/2022 | Jiang et al. | |
| 2023/0032684 | A1 | 2/2023 | Go et al. | |
| 2023/0359069 | A1 | 11/2023 | Thomas et al. | |
| 2025/0164692 | A1 | 5/2025 | Novick et al. | |

OTHER PUBLICATIONS

International Search Report and Written Opinion in International Appln. No. PCT/US2024/056775, mailed on Jan. 15, 2025, 17 pages.

International Preliminary Report on Patentability in International Appln. No. PCT/US2024/014614, mailed on Aug. 21, 2025, 9 pages.

* cited by examiner

1800c

1800d

WAVELENGTH GENERATOR BASED ON RING RESONATOR PHOTONIC DEVICES

CROSS-REFERENCE TO RELATED APPLICATIONS

This claims the benefit of priority to Provisional Application No. 63/483,435, titled "Resonator for Generating Different Wavelengths from Input Light Source," filed on Feb. 6, 2023, the contents of which are hereby incorporated by reference.

BACKGROUND

Silicon photonics devices utilize silicon as an optical medium and semiconductor fabrication techniques for patterning the devices with sub-micron precision. Because silicon is used as a substrate for most integrated circuits, silicon photonic devices can be hybrid devices that integrate both optical and electronic components onto a single microchip. Silicon photonic devices can also be used to facilitate data transfer between microprocessors, a capability of increasing importance in modern networked computing.

SUMMARY

Integrated photonic devices utilizing ring resonators for multiwavelength sources and/or optical filters are described. The architectures described are versatile and scalable, enable integrated devices capable of efficiently providing multiple modulated optical signals across frequency bands commonly used in conventional optical communication systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
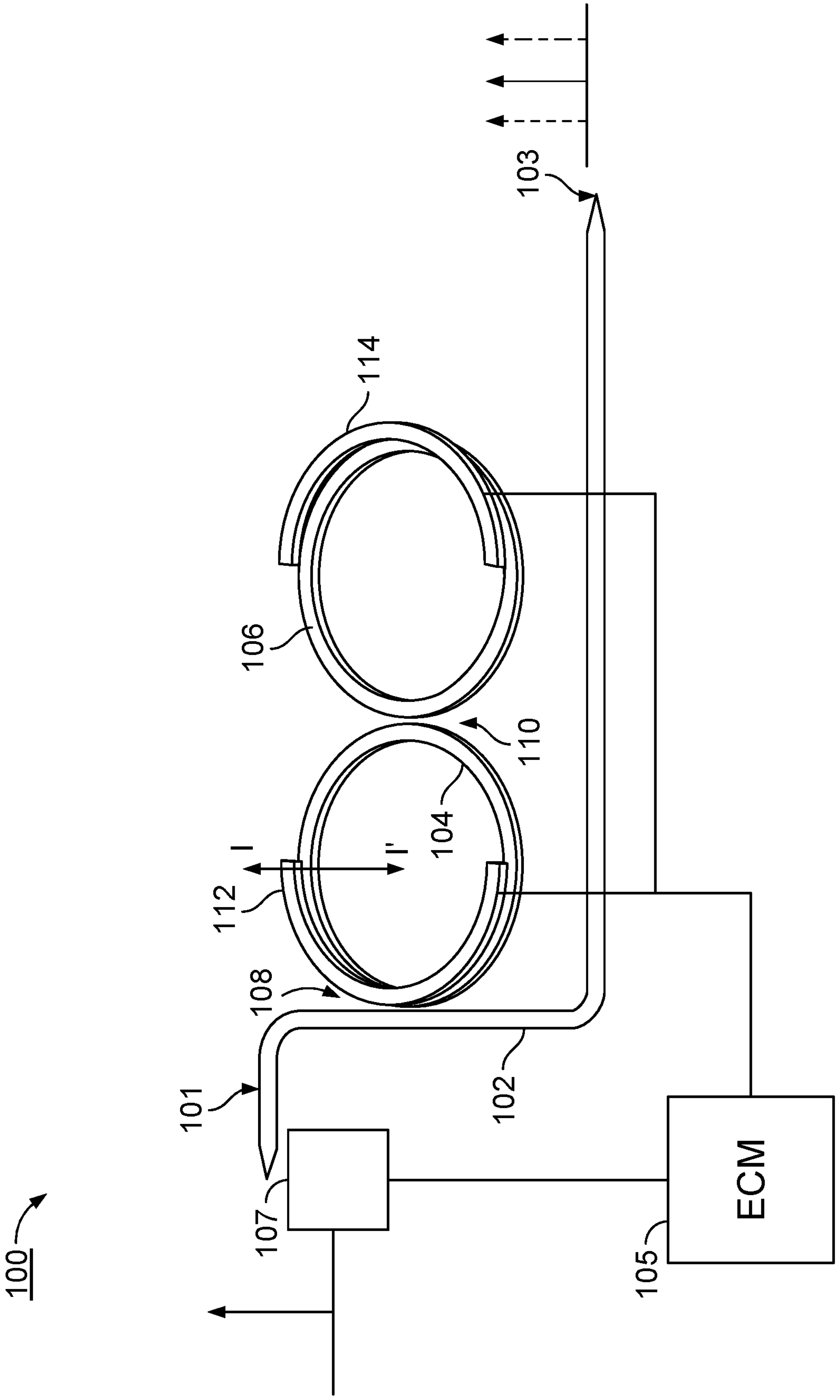
FIG. 1 is a schematic of an example of a wavelength generator.
Figure 2:
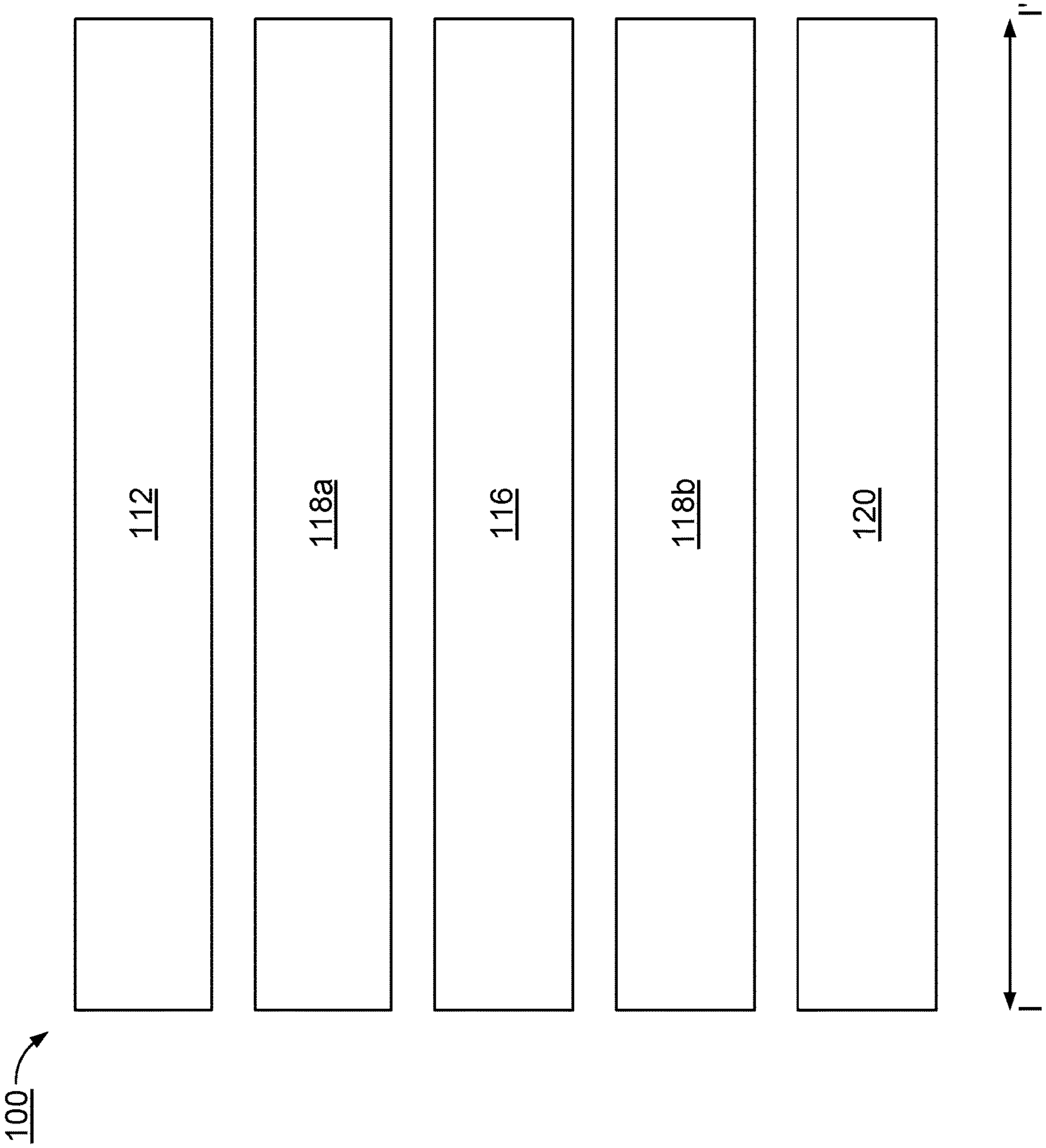
FIG. 2 is a cross-sectional view of the wavelength generator from FIG. 1.

With reference to FIGS. 1 and 2, a wavelength generator 100, e.g., a narrow linewidth wavelength generator, includes a planar bus waveguide 102, a main ring resonator 104, an auxiliary ring resonator 106, and heating elements 112 and 114 thermally coupled to the main ring resonator 104 and the auxiliary ring resonator 106, respectively. An electronic control module 105 is in communication with an optical source 107 and the heating elements 112 and 114.

The optical source 107 emits a pump wave at a pump frequency that couples into the planar bus waveguide 102 through an input port 101. The pump with travels through the planar bus waveguide 102 and toward a region of the planar bus waveguide 102 proximate to the main ring resonator 104. The pump wave couples into the main ring resonator 104, where the resonant frequency of the main ring resonator 104 is detuned to overlap with the pump frequency. For example, changing the temperature of the main ring resonator 104 can increase the resonant frequency, which can lead to overlap with the pump frequency. In both the main and the auxiliary ring resonators 104 and 106, a nonlinear optical process leads to the generation of two new waves with different frequencies, e.g., photons from the pump wave annihilate to create signal and idler photons. The signal and idler waves couple into the auxiliary ring resonator 106 and build up in strength. Then the signal and idler waves couple back into the main ring resonator 104 and into the planar bus waveguide 102. The pump, signal, and idler waves travel through the planar bus waveguide 102 to an output port 103. The energy of the signal, pump, and idler waves are represented as three arrows in order of increasing wavelength along an axis.

The optical source 107, e.g., a pump source, is a laser, such as a single-frequency continuous-wave pump laser. The optical source 107 can be coupled to the wavelength generator wavelength generator 100 through a fiber. In some implementations, the coupling includes a lens coupling, butt-coupling, or monolithic integration of the laser.

Each of the heating elements 112 and 114 is disposed on top of the main and auxiliary ring resonators 104 and 106, respectively. Each of the heating elements 112 and 114 has a shape that at least partially matches a shape of the main and auxiliary ring resonators 104 and 106, respectively. For example, each of the heating elements 112 and 114 can be a semicircle, as depicted in FIG. 1. In some implementations, the coverage of the main and auxiliary ring resonators 104 and 106 by the heating elements 112 and 114 is selected to be as large as possible without heating element 112 affecting the auxiliary ring resonator 106 and heating element 114 affecting the main ring resonator 104, e.g., three quarters of a circle, with the regions of each of the main and auxiliary ring resonators 104 and 106 near coupling region 110 being uncovered. The heating elements 112 and 114 apply heat to the main and auxiliary ring resonators 104 and 106 by supplying an electric current.

In some implementations, the radius of the main ring resonator 104 and the auxiliary ring resonator 106 is in a range of 50 microns to 200 microns. The sizes of the main ring resonator 104 and the auxiliary ring resonator 106 can be different or the same. Each of the main and auxiliary ring resonators 104 and 106 can have a resonance frequency, e.g., a main ring resonance frequency and an auxiliary ring resonance frequency, respectively, determined by the circumference of each resonator. For example, the auxiliary ring resonator 106 can be ⅔ to 3⁄2 the size of the main ring resonator 104 depending on the desired signal and idler wavelengths.

The cross-sectional view in FIG. 2 is along the line I-I' in FIG. 1. In this example, the main ring resonator 104 includes a core layer 116, which can be a patterned waveguide. The core layer 116 is clad with dielectric layers 118*a* and 118*b*. A substrate 120 can be in contact with the dielectric layer 118*b* and support the core layer 116 and dielectric layers 118*a* and 118*b*. Heating element 112 can be disposed on top of dielectric layer 118*a*. The wavelength generator 100 can be fabricated in a manner compatible with conventional foundry fabrication processes.

The materials making up wavelength generator 100 can vary. Each of the planar bus waveguide 102, the main ring resonator 104, and the auxiliary ring resonator 106 can include a nonlinear optical material, such as silicon, silicon nitride, aluminum nitride, lithium niobate, germanium, diamond, silicon carbide, silicon dioxide, glass, amorphous silicon, silicon-on-sapphire, or a combination thereof. In some implementations, the core layer 116 is silicon nitride with patterned doping. In some implementations, the dielectric layers 118*a* and 118*b* include silicon dioxide.

In some implementations, the heating elements 112 and 114 include metal. In some implementations, either one of or both of heating elements 112 and 114 is a resistive heater formed in the core layer 116, e.g., carrier-doped silicon. In some implementations, the heating elements 112 are generally disposed adjacent, e.g., next to, below, in contact with, to the main ring resonator 104 and the auxiliary ring resonator 106. In some instances, the resonator resonance tuning can be done with other approaches, such as the electro-optic effect, free-carrier injection, or microelectromechanical actuation.

In some implementations, various elements of the device, e.g., the planar bus waveguide 102, the main ring resonator 104, the auxiliary ring resonator 106, and the heating elements 112 and 114 are integrated onto a common photonic integrated circuit by fabricating all the elements on the substrate 120.

Light can travel from one waveguide to another when the waveguides are coupled. Placing the main ring resonator 104 proximate to the planar bus waveguide 102 provides a coupling region 108. The coupling region 108 is a region where the planar bus waveguide 102 and the main ring resonator 104 are sufficiently close to allow an optical signal traveling in the planar bus waveguide 102 to enter the main ring resonator 104, e.g., evanescent coupling, and vice versa. Similarly, placing the main ring resonator 104 proximate to the auxiliary ring resonator 106 provides the coupling region 110, where optical signals can travel from the main ring resonator 104 to the auxiliary ring resonator 106 and vice versa.

The strength of the couplings in the coupling regions 108 and 110 depend on various factors, such as a distance between the planar bus waveguide 102 and the main ring resonator 104 and the distance between the main ring resonator 104 and the auxiliary ring resonator 106, respectively. The radius of curvature, the material, and the refractive index of each of the main ring resonator 104 and auxiliary ring resonator 106 can also impact the coupling strength. Reducing the distance between the heating elements 112 and 114 and the core layer 116 can increase the thermo-optic tuning efficiency. For example, 0.1% or more of light (e.g., 1% or more, 2% or more, such as up to 10% or less, up to 8% or less, up to 5% or less) can be incoupled into the main ring resonator 104, the auxiliary ring resonator 106, and the planar bus waveguide 102.

The strength of coupling for a wave into a material can be frequency dependent. For example, detuning the resonant frequency of the main ring resonator 104 to overlap with the pump frequency can increase the coupling efficiency of the pump wave into the main ring resonator 104. Overlap refers to the spread in frequency of the pump wave, since the pump wave has a finite width in frequency. In some implementations, the pump wave is slightly higher in frequency than the resonant frequency, e.g., blue-shifted, of the main ring resonator 104 during while coupling into the main ring resonator 104 and during the operation of the wavelength generator 100. As another example, the properties and operating conditions of the main and auxiliary ring resonators 104 and 106 can be selected to increase the coupling efficiency between the main and auxiliary ring resonators 104 and 106 for the signal and idler wavelengths.

Figure 3B:
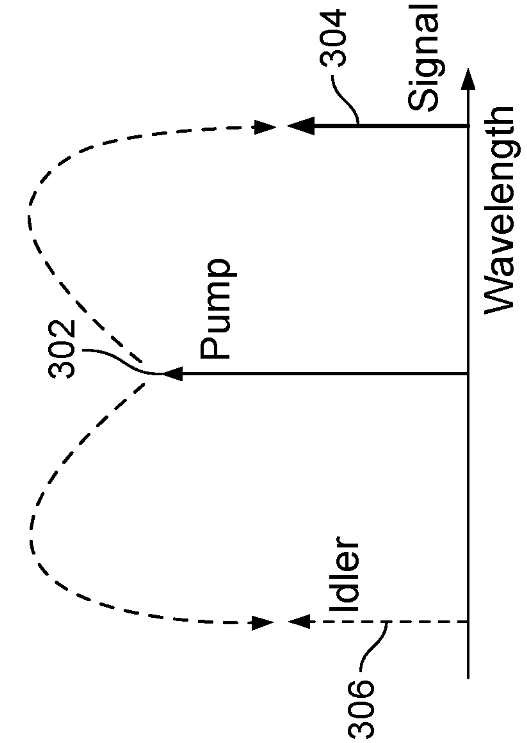
FIGS. 3A and 3B depict schematics of a nonlinear optical interaction that occurs within the wavelength generator from FIG. 1.
Figure 3A:
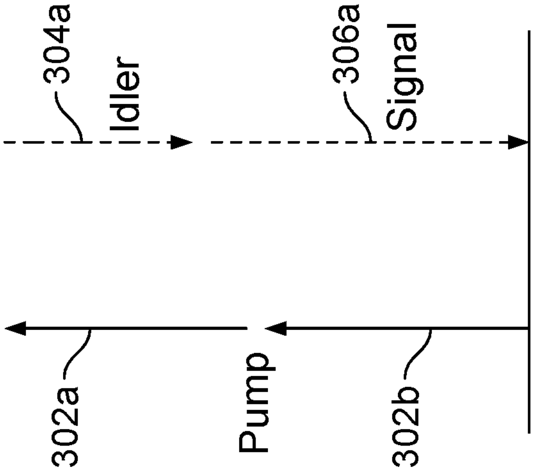

With reference to FIGS. 3A and 3B, nonlinear interactions, e.g., parametric oscillation via four-wave mixing, occur within the wavelength generator 100. Four-wave mixing is a third-order nonlinear effect caused by the dependence of the refractive index of a nonlinear crystal on the intensity of a wave. When a nonlinear crystal is irradiated with a pump wave 302, two pump photons 302*a* and 302*b* of the pump wave 302 annihilate to create signal and idler photons 304*a* and 306*a*. In this example, the input signal is the pump wave 302, and the two spontaneously generated frequencies are referred to as the signal wave 304 and idler wave 306. Conventionally, the spontaneously generated frequency with a higher frequency is referred to as the signal, and the spontaneously generated frequency with a lower frequency is referred to as idler. The frequencies of the spontaneously generated waves are determined by energy conservation, e.g., $2\omega_{pump}=\omega_{signal}+\omega_{idler}$. In FIG. 3A, the heights of each of the pump photons 302*a* and 302*b*, idler photon 304*a*, and signal photon 306*a* are proportional to the frequency and thus energy of the photon. The sum of the heights of the pump photons 302*a* and 302*b* is the same as the sum of the heights of the signal and idler photons 304*a* and 306*a*, which suggests that energy is conserved.

Momentum conservation requires that the momentum of the two pump photons 302*a* and 302*b* equals the sum of the momentum of the signal and idler photons 304*a* and 306*a*, e.g., $\hbar k_{pump}=\hbar k_{signal}+\hbar k_{idler}$. The momentums of the pump, signal, and idler waves determine the intensity of the signal and idler waves. The signal experiences parametric gain $$G = 1 + \left[\frac{\gamma P}{g}\sinh(gL)\right]^2$$

with $g=\sqrt{\gamma P\Delta k-(\Delta k/2)}$, where P is the pump power in the cavity, $\gamma$ is the nonlinear parameter, L is the interaction length, and $\Delta k=2k_{pump}-k_{signal}-k_{idler}=2n(\lambda_{pump})/\lambda_{pump}-n(\lambda_{signal})/\lambda_{signal}-n(\lambda_{idler})/\lambda_{idler}$. The maximum gain occurs when $\Delta k=-2\gamma P$, which is referred to as the phase-matching condition. Accordingly, wavelength generator 100 can be designed to minimize the phase mismatch by controlling the material and waveguide properties of the nonlinear resonator in the auxiliary ring resonator.

For efficient generation of the signal and idler, the pump, signal, and idler are triply resonant with the cavity. For example, the main ring resonator 104 can have a resonance frequency equal to the pump frequency to increase coupling between the planar bus waveguide 102 and main ring resonator 104. Within the main ring resonator 104, the pump frequency can be detuned, e.g., drift toward a different frequency, such as the resonant frequency of the main ring resonator 104. The heating element 112 of the main ring resonator 104 can be used to control the detuning between the pump wave 302 and the main ring resonance frequency.

In order to match the signal and idler frequency with the resonator, the coupled resonator geometry is used to excite an avoided mode crossing (AMC), e.g., introduce a perturbation in the resonator dispersion that allows for modification of the phase-matching conditions for efficient four-wave mixing interactions. Mode-crossings occur when there is strong coupling between frequency-degenerate but spatially distinct modes. Mode-crossings are accompanied by a localized change in the dispersion of the auxiliary ring resonator 106 near the mode-crossing frequency, local shifts in resonances of the auxiliary ring resonator 106, and hybridization of the strongly coupled modes. To modify the phase matching conditions, the position of the mode crossing can be controlled by tuning the auxiliary resonance 106 using the heating element 114, which controls the parametric oscillation of the pump, signal, and idler waves 302, 304, and 306. The EMC 105 can adjust the operating conditions of the main ring resonator 104 for output power optimization.

Figure 4:
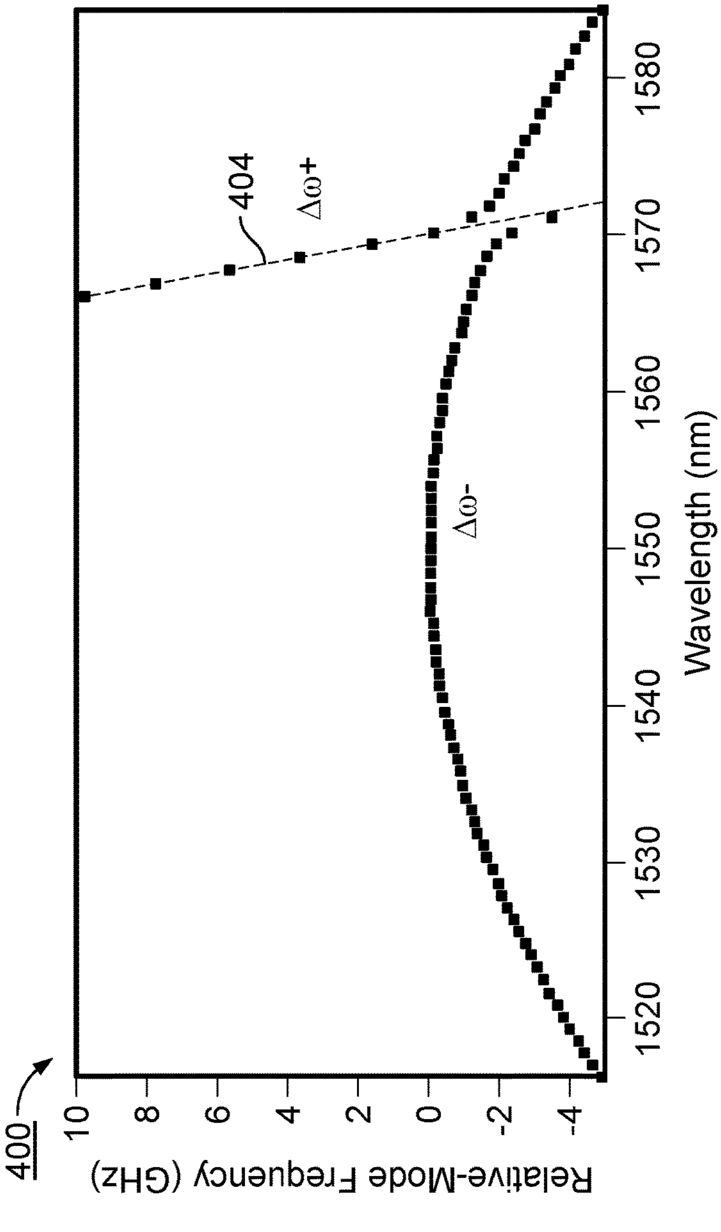
FIG. 4 is a plot depicting avoided mode crossing.

With reference to FIG. 4, two modes interact with each other in plot 400. The relative mode difference of the hybridized modes $\Delta\omega_{\pm}$ is plotted against the resonance wavelength. The relative mode frequencies of the hybridized modes are $\Delta\omega_{\pm}(\mu)=\omega_{\pm}(\mu)-\omega_0-2\pi\mu FSR$, where $\omega_0$ is the fundamental frequency, $\mu$ is an integer value representing the resonance order, and FSR is the free spectral range of the resonator.

The location of where the relative mode frequencies $\Delta\omega_{\pm}$ almost cross, indicated by the dotted line 404, is determined by the resonances of the auxiliary ring resonator 106 and the main ring resonator 104. The mode interaction occurs when the two resonances overlap. The position of overlap determines the frequency one of the signal and idler waves. The other wave, e.g., signal or idler wave, is determined by the condition, $2\omega_{pump}=\omega_{signal}+\omega_{idler}$.

By tuning the heating element 114, the EMC 105 determines the spectral location of the mode interaction, allowing for discrete tuning of the generated wavelengths where the wavelength steps are dictated by the FSR of the resonator. The ECM 105 can send instructions to the heating element 114 to tune the position where the mode interaction occurs. As the current supplied to the heating element 114 increases or decreases, the dotted line moves to the right or left in FIG. 4. By shifting where the mode interaction occurs and thus what frequencies the idler and signal waves have, the ECM 105 can reduce the phase mismatch, e.g., satisfy the phase-matching condition.

Although the heating element 114 exciting AMC mainly affects the auxiliary ring resonator 106, some of the heat from heating element 114 can impart a thermal shift on the location of the main ring resonance and affect the detuning between the pump and the main ring resonator 104, as well, due to cross talk between the main ring resonator 104 and the auxiliary ring resonator 106. In some implementations, the location of the AMC is fixed during operation and the instructions for the heating element 112 are selected for maximum signal and idler power.

Figure 5:
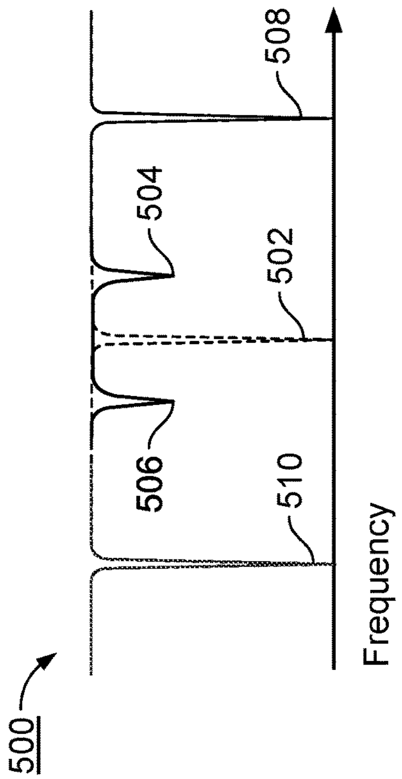
FIG. 5 is a plot depicting thermal tuning.

With reference to FIG. 5, when the main and auxiliary resonance is overlapped at position 502 an avoided mode crossing is excited resulting in splitting of the mode to form the hybridized modes 504 and 506, as represented in plot 500. When the pump wave is injected into a difference mode, then a signal and idler are generated such that the signal is generated is spectrally located in one of these hybridized modes ($\omega_+$). Using thermal tuning, the hybridized mode can be shifted to location 510 and 508 to generate a signal at that location. The idler wavelength is determined by the condition $\omega_i=2\omega_p-\omega_s$, where $\omega_p$, $\omega_s$, and $\omega_i$ correspond to the pump, signal, and idler frequencies.

Multiple devices having the basic architecture described above can be combined to increase the number of output channels. For example, referring to FIG. 6, a device 600 includes two resonator pairs 109, e.g., a main ring resonator 104 and an auxiliary ring resonator 106. The device 600 can have a single input port 101 that receives light from optical source 107. A Y-splitter 115 is coupled to the input port 101 and separates the paths of input light along different branches of waveguide 102*a*. Other splitter geometries, such as a multi-mode interference splitter, can be implemented as well.

The electronic control module 105 can send different instructions for thermal tuning to the heating elements 112 and 114 in the resonator pairs 109. If the heating elements 114 for resonator pairs 109 operate differently, the location of the AMC for each of resonator pairs 109 can be different, which can lead to different signal and idler wave frequencies. To represent the different signal and idler wave frequencies schematically, the output ports 103 each have three wavelengths, where the location of the wavelength on the x-axis, e.g., horizontal direction, corresponds to the wavelength of the output wavelength. For example, the input port 101 receives a pump wave 602 with a pump wavelength. The first resonator pair 109 has an output port 103*a* with three wavelengths including the same pump wave 602, and a signal wave 604 with a signal wavelength less than the pump wavelength and an idler wave 606 within idler wavelength greater than the pump wavelength. The second resonator pair 109 has an output port 103*b* with three wavelengths including the same pump wave 602, and a signal wave 605 with a signal wavelength less than the pump wavelength and the signal wavelength of the first resonator pair 109, and an idler wave 607 with an idler wavelength greater than pump wavelength and the idler wavelength of the first resonator pair 109.

In this example, there are four output wavelengths in addition to the pump wavelength. Depending on the thermal tuning, each additional wavelength generator and a device configured in parallel can create two distinct output wavelengths. The power of the input pump wave can be selected based on the number of resonator pairs in the device, since the power of the input pump wave will be divided among the different paths.

Figure 6:
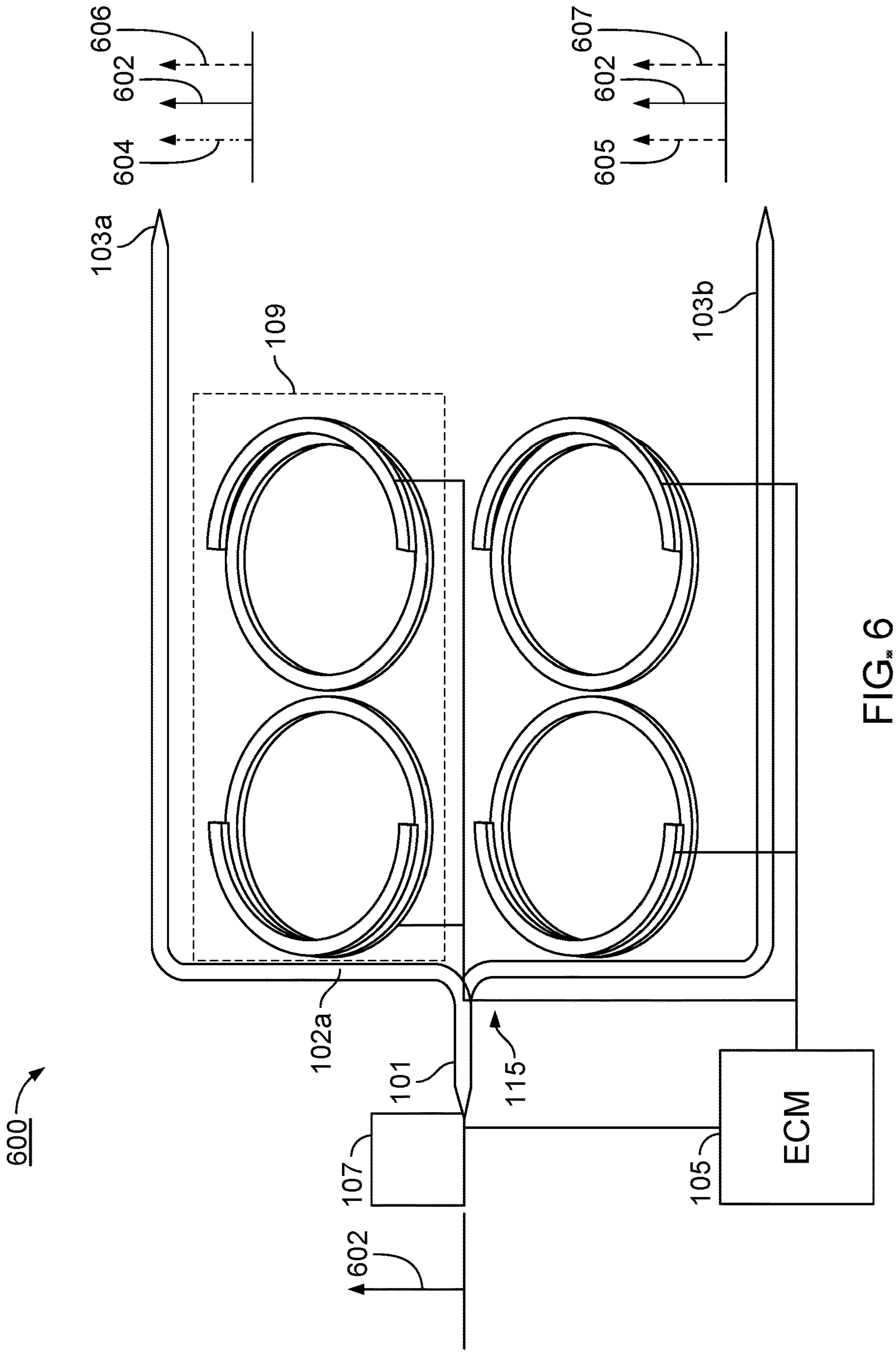
FIG. 6 depicts a device including two resonator pairs in parallel.

Although two resonator pairs are depicted in FIG. 6, the number of resonator pairs in parallel can be increased by using a splitter that separates the input light into as many paths as there are resonator pairs. In some implementations, a multimodal interference splitter is used instead of the Y-splitter 115. Scaling the number of resonator pairs in parallel can allow for 4 to 64 wavelengths channels.

Figure 7:
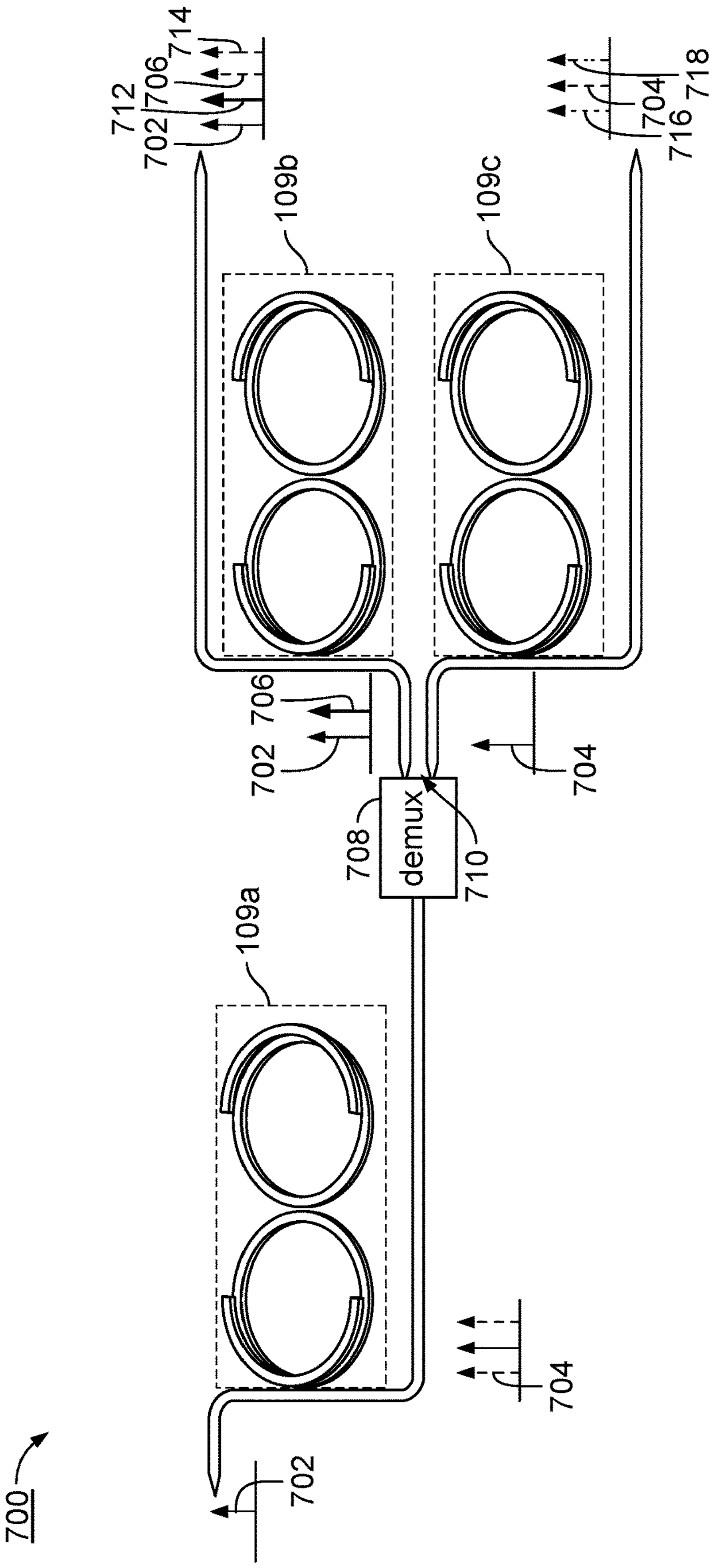
FIG. 7 depicts a device including a wavelength generator in series with two resonator pairs in parallel.

While the foregoing example uses a parallel device architecture, series device architectures and architectures that include both series and parallel configurations are also possible. For example, referring to FIG. 7, a device 700 includes a resonator pair 109*a* in series with two resonator pairs 109*b* and 109*c* in parallel. However, just as in FIG. 6, the heating elements of the auxiliary ring resonator of each of the pairs of resonators can have different instructions for thermal tuning, resulting in different generated signal and idler wavelengths for each wavelength generator.

For example, pair 109*a* can receive a pump wave with a first wavelength 702. Resonator pair 109*a* generates signal and idler waves with second and third wavelengths 704 and 706, respectively. In some implementations, the second and third wavelengths 704 and 706 can be relatively widely spaced from the pump frequency. A demultiplexer (demux) 708 can separate the second wavelength 704 from the first and third wavelengths 702 and 706. The demultiplexer 708 can be coupled to a splitter 710 that is coupled to different input ports for each of resonator pairs 109*b* and 109*c*. Resonator pair 109*b* can receive the first and third wavelengths 702 and 706, with the third wavelength 706 as the pump frequency and generate additional wavelengths 712 and 714. Resonator pair 109*c* receives second wavelength 704 as the pump frequency and to generate six and seventh wavelengths 716 and 718, respectively. Accordingly, device 700 generates six new wavelengths in addition to the first wavelength 702.

Although device 700 depicts a single resonator pair 109*a* in series with two resonator pairs 109*b* and 109*c*, other combinations of resonator pairs being in series and parallel are possible. For example, multiple resonator pairs can be in parallel with each other, and each of the resonator pairs in parallel can be in series with additional resonator pairs.

In some implementations, the generated signal and idler wavelengths of each wavelength generator can be selected to fall within a frequency grid, e.g., equally spaced, defined by the free spectral range. As in this example, the resonator pair 109*a* generates more widely spaced signal and idler wavelengths, and then each of resonator pairs 109*b* and 109*c* generate more narrowly spaced signal and idler wavelengths around each of the signal and idler wavelengths from resonator pair 109*a*.

In general, wavelength generators can be combined to provide 4-64 output channels each supporting one or more output signals, provided the signal from each output channel has sufficient power for its end use application. Using a laser array to generate multiple-wavelength sources with dense and consistent spacing can be difficult. Further, generating a multi-wavelength source with uniform peak power and high power is also a challenge. The following examples provide multi-wavelength source with consistent, dense, and powerful peaks, which can be beneficial for various application. In some implementations, output signals have a finite bandwidth, e.g., a nonzero pulse width. When a signal has a finite bandwidth, the frequency of that signal is the peak frequency of the signal.

Figure 8:
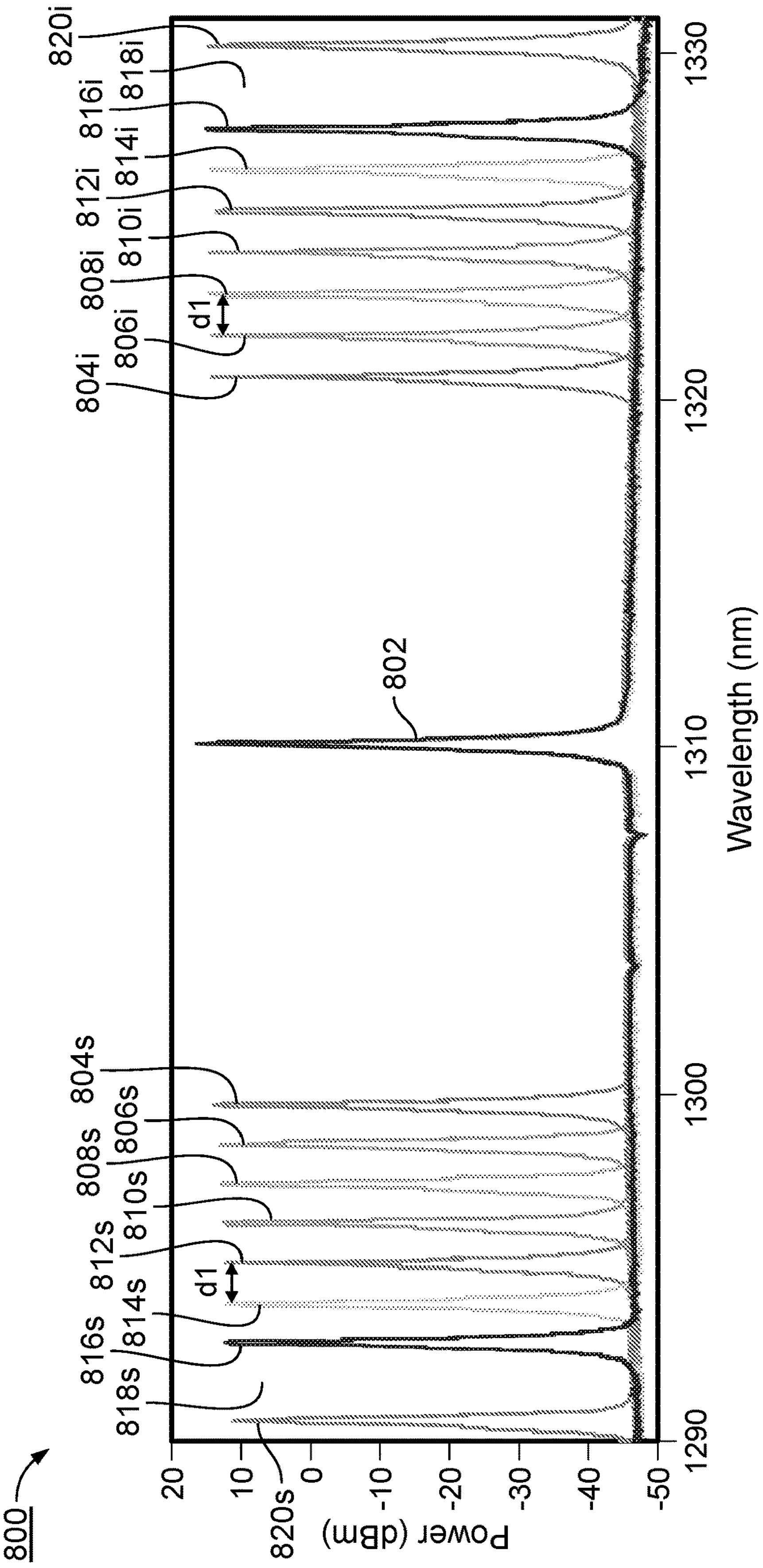
FIG. 8 is a plot depicting the output signals of an example device including multiple resonator pairs.

For example, various resonator pairs can be combined in series and parallel to create a device with flexible operating wavelengths with near infrared (NIR) to shortwave infrared (SWIR) wavelengths, including O-band, C-band, and L-band. With reference to FIG. 8, a device includes nine resonator pairs in parallel and generate an output signal. A central peak 802 in plot 800 is the pump frequency of the first wavelength generator in the device, and there are nine equally spaced peaks 804*i*-820*s* and 804*s*-820*s* for each of the idler and signal waves, e.g., 804*i* and 804*s* are a pair of generated idler and signal waves, on each side of the central peak 802.

Each of the equally spaced peaks has roughly the same power, e.g., as measured on the y-axis. For example, each of the peaks is about equal to 11 dBm, e.g., ±0.5 dBm. In some implementations, the power of each peak can be at least 50 mW or 100 mW.

The spacing between adjacent signal and idler waves can be consistent, e.g., $d_1$, the distance between peaks 806*s* and 808*s*, can be within 2.5% percent of $d_2$, the distance between peaks 812*i* and 814*i*. In some implementations, the spacing between peaks is 1 nm, 5 nm, 10 nm, 20 nm, or more. The spacing can be directly uniform, e.g., with frequency accuracy of ±5 GHz by tuning the current in heater element 116.

The shape of plot 800, with its equally spaced peaks of similar magnitude, resembles a comb, and devices with similar output signals are sometimes called optical frequency combs. Accordingly, the devices described herein can be used to generate wideband, tunable optical frequency combs.

The qualities of the multi-wavelength source can vary based on the configuration of individual resonator pairs within the device and the spacing between the resonator pairs within the device. For example, the cross-section of individual ring resonators within the resonator pairs, the gap between a planar bus waveguide 102 and main ring resonator 104, the gap between the main and auxiliary ring resonators 104 and 106 can be varied. As another example, controlling the strength of the coupling between the main and auxiliary ring resonators 104 and 106 can allow for flexible channel spacing in the output signal. For example, different coupling strengths between the main and auxiliary ring resonators 104 and 106 can alter the phase mismatch between the generated pump, idler, and signal waves. In some implementations, a stronger coupling between the main and auxiliary ring resonators 104 and 106 leads to signal and idler pairs with a greater frequency spacing.

As another example, the device can be used as an O-band wavelength demultiplexer (WDM) source. The WDM source can have 20 nm grid spacing between the peaks of the output signal, e.g., based on CWDM4 MSA specifications, 100-400 GHz grid spacing, e.g., based on CW-WDM MSA specifications, or have 4 LAN WDM grid spacing (1295.56, 1300.05, 1304.58, 1309.14 nm), e.g., based on 100GBASE-LR4 specifications. As depicted in FIG. 8, the device can generate band interleaving where different sections of multi-wavelength, e.g., 8 or 16 wavelengths, are generated as a single band separated by a configurable spacing. This reconfigurability of the generated signal/idler allows the device to be also used as a narrow linewidth tunable O-band laser. The output wavelength of the wavelength generator can be tuned over the entire O-band wavelength range with discrete spacing corresponding to the resonator FSR (in the range of 10 GHz to 1 THz). Fine continuous tuning of the wavelength can be achieved with synchronous tuning of the pump laser wavelength and the cavity resonance. As another example, the device can be used as a narrow linewidth tunable C-band laser source for optical coherent communication, e.g., based on OIF implementation agreement for 400ZR Coherent Optical Interface. Using a combination of different pumps and devices, multiple bands can be combined (e.g., O- and C-band). As another example, a device can be an integrated optical source for an energy-efficient interconnection for artificial intelligence (AI) computations.

Figure 9:
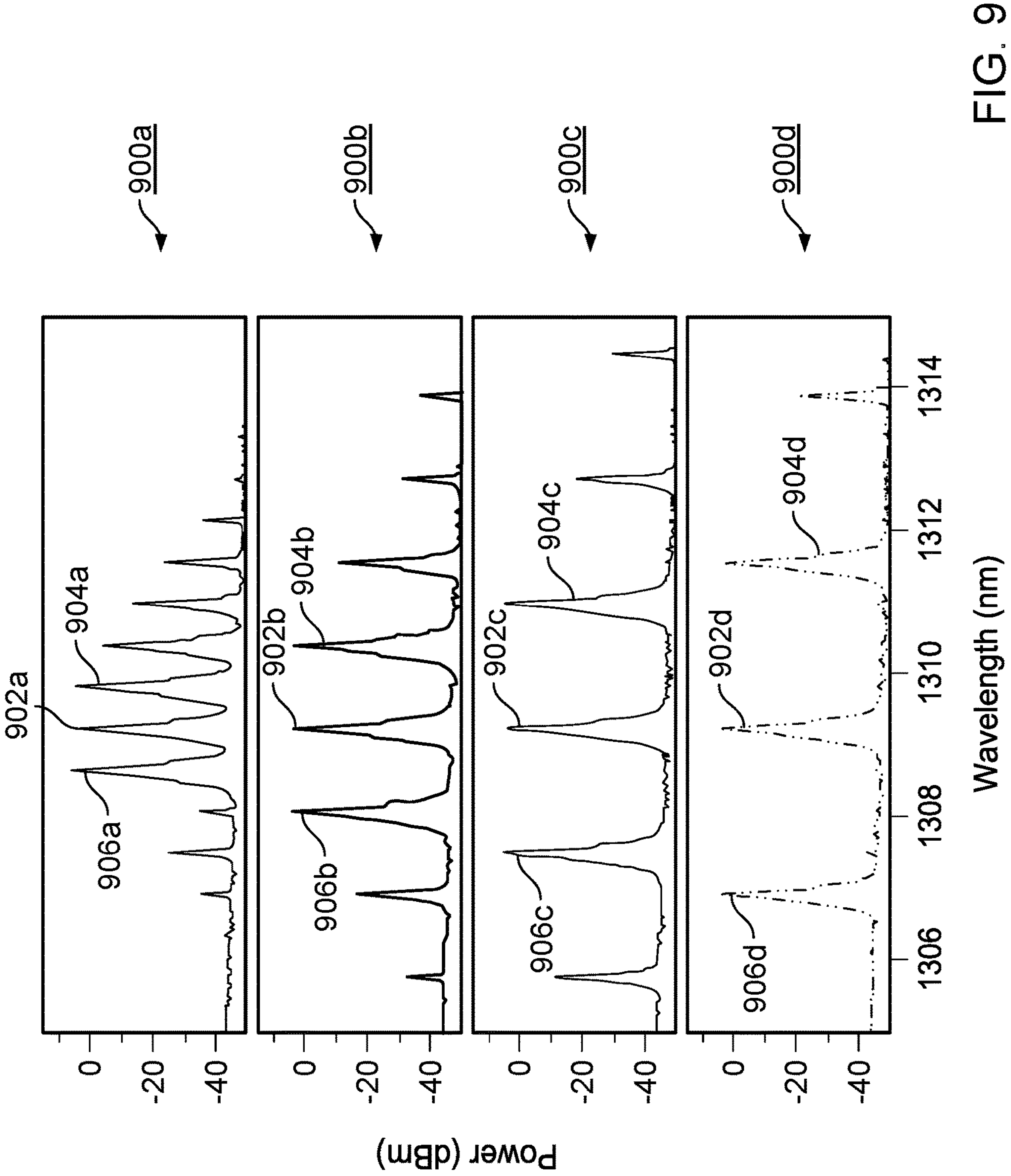
FIG. 9 is a plot depicting the output signals of another example device including multiple resonator pairs.

With reference to FIG. 9, different possible channel spacings for a tunable O-band device are possible. Although the FSR of the device is the same in each of plots 900*a*, 900*b*, 900*c*, and 900*d*, e.g., 100 GHz, each plot has a different channel spacing, e.g., 100, 200, 300, and 400 GHz. The same device can generate the four different plots 900*a*, 900*b*, 900*c*, and 900*d* with different grid spacing based on how the heating elements thermally tune the position of AMC. Each of plots 900*a*, 900*b*, 900*c*, and 900*d* has a pump frequency peak 902*a*, 902*b*, 902*c*, and 902*d*, a signal frequency peak 904*a*, 904*b*, 904*c*, and 904*d*, and an idler frequency peak 906*a*, 906*b*, 906*c*, and 906*d*. For example, Table 1 includes the wavelength and power for the signal, residual pump, and idler waves corresponding to each of plots 900*a*, 900*b*, 900*c*, and 900*d*. The residual pump wave is the signal and the output signal with the same frequency as the input pump wave. In this configuration, the residual pump wave has a lower power than the input pump with.

| | Wavelength (nm) | Power (mW) |
|---|---|---|
| Signal (900a) | 1308.7 | 5 |
| Residual Pump (900a) | 1309.2 | 2.43 |
| Idler (900a) | 1309.8 | 3.28 |
| Signal (900b) | 1308.1 | 2.89 |
| Residual Pump (900b) | 1309.2 | 2.3 |
| Idler (900b) | 1310.2 | 2.56 |
| Signal (900c) | 1307.5 | 3.41 |
| Residual Pump (900c) | 1309.2 | 2.56 |
| Idler (900c) | 1311 | 3.15 |
| Signal (900d) | 1306.9 | 2.92 |
| Residual Pump (900d) | 1309.2 | 3.14 |
| Idler (900d) | 1311.6 | 2.13 |

In each of plots 900*a*, 900*b*, 900*c*, and 900*d*, the power of each of the peaks follows the shape of an envelope centered on the pump frequency 902*a-d*. Moving outward from the pump frequency at the center of each plot, the peaks of the signal and idler waves decrease. In some implementations, this decrease can be consistent. For example, moving outward from the central peak, each peak in decrease by a certain percent, e.g., five percent.

In some implementations, more frequencies than the desired peaks corresponding to an equally spaced grid are generated in the device, e.g., additional four-wave mixing processes. In these implementations, a filter can be used between the different resonator pairs in series and parallel to each other or at the final output port of the device to remove undesired pulses from the output signal.

Figure 10:
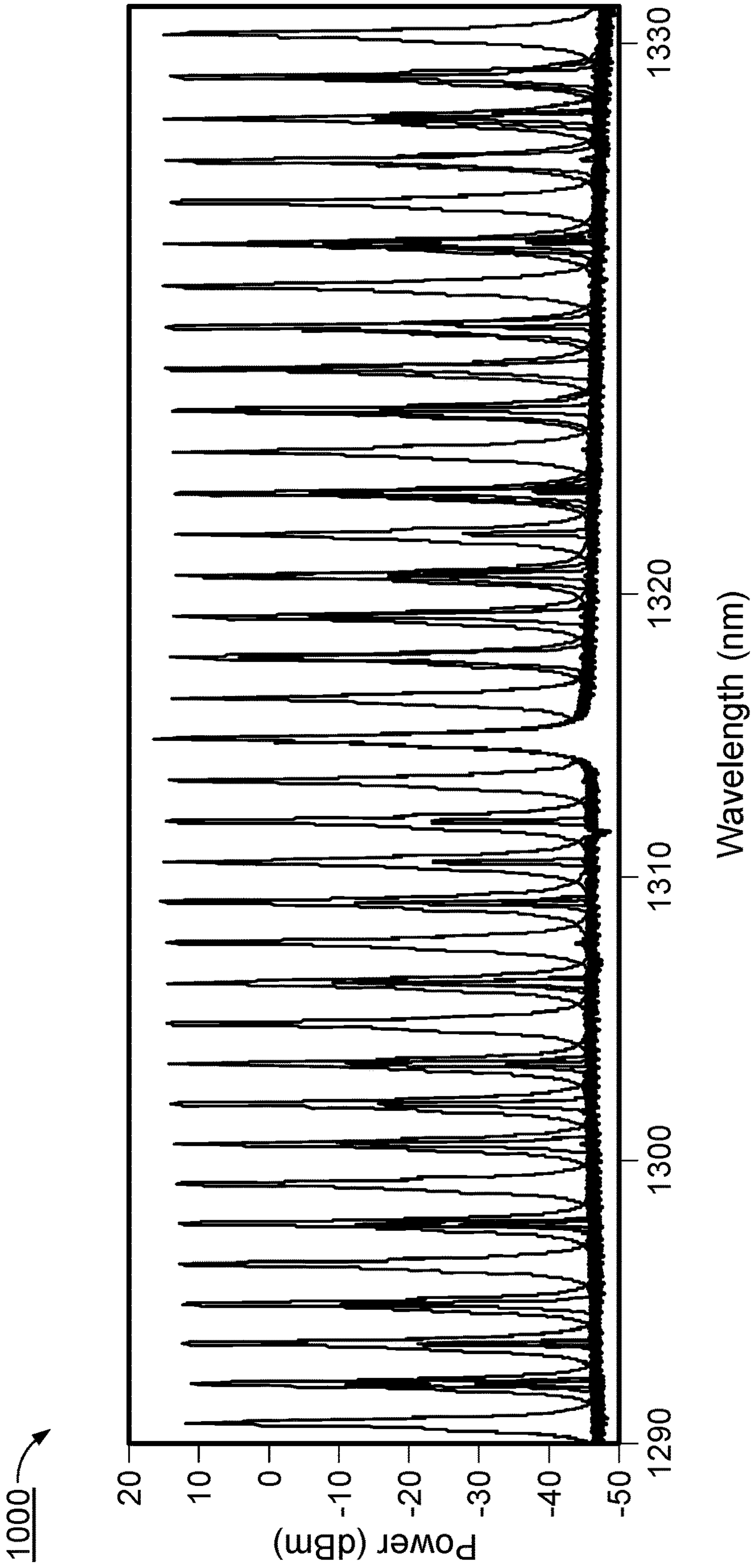
FIG. 10 is a plot depicting the output signals of a further example device including multiple resonator pairs.

With reference to FIG. 10, an example of a device using multiple resonator pairs described herein is a wavelength demultiplexer. In this example, the device can have a single high power pump laser split 17 ways as input to 17 parallel wavelength generators. Alternatively, the various wavelength generators can be arranged in both series and parallel, e.g., some of the frequencies are generated sequentially. For example, the device can have a 50 GHz to 400 GHz, e.g., 50 GHz or more, 100 GHz or more, 200 GHz or more, or 250 GHz or more free spectral range. The device can have a cross-section of 100 nm-500 nm by 500-2500 nm, e.g., 100 nm or more, 200 nm or more, 400 nm or more, or 500 nm or more by 500 nm or more, 1000 nm or more, 1500 or more, or 2000 nm or more. The gap between the planar bus waveguide and the main ring resonator can be 100 nm to 1 micron, e.g., 100 nm or more, 200 nm or more, 500 nm or more, or 750 micron or more, and the gap between the main ring resonator and the auxiliary ring resonator can be 100 nm to 1 micron, e.g., 100 nm or more, 200 nm or more, 500 nm, or more or 750 nm or more. In some implementations, the pump source can be a distributed feedback (DFB) laser with 100 mW to 200 mW of power, e.g., 150 mW or more. The device includes 17 resonator pairs in series and parallel to generate 34 new frequencies in addition to the original pump frequency.

As depicted in plot 1000, there are 34 peaks equally spaced on each side of the central pump frequency. The power and wavelength of each peak are as follows in units of (nanometers, dBm): (1290.6, 11.62), (1291.7, 10.58), (1292.9, 12.33), (1294, 12.03), (1295.1, 12.5), (1296.3, 12.49), (1297.4, 12.93), (1298.6, 13.02), (1299.7, 13.75), (1300.8, 14.29), (1302, 14.49), (1303.2, 14.44), (1304.3, 14.45), (1305.5, 15.43), (1306.6, 14.98), (1307.8, 14.48), (1308.9, 14.07), (1310.1, 16.447), (131.3, 13.64), (1312.4, 13.85), (1313.6, 13.43), (1314.8, 13.39), (1315.9, 13.18), (1317.1, 13.03), (1318.3, 13.5), (1319.5, 13.3), (1320.7, 14.3), (1321.9, 14.43), (1323, 14.98), (1324.2, 14.97), (1325.4, 13.73), (1326.6, 14.38), (1327.8, 15.12), (1329, 13.98), and (1330.2, 14.87).

Photonic devices such as those described above can be combined with integrated add-drop resonant filters to filter signals having different frequencies, e.g., either to add or drop the signal from a waveguide. With reference to FIG. 11A, an add-drop resonant filter 1400 includes a first waveguide 1402, a second waveguide 1404, and a ring resonator 1406. Input light can travel into the add-drop resonant filter 1400 at the input port 1408. Due to a coupling 1410 between the first waveguide 1402 and the ring resonator 1406, some of the light enters the ring resonator 1406 at the bottom of the ring resonator 1406. The rest of the light continues to travel through the first waveguide 1402. The signal in the ring resonator 1406 can travel in a counterclockwise direction until it reaches another coupling 1412.

At the coupling 1412, some of the light is “dropped,” e.g., exits the ring resonator 1406. Light can be “added” to the ring resonator 1406 through an additional port 1414 in the second waveguide 1404. Light added at the additional port 1414 travels in the opposite direction as light that entered through an input port in the first waveguide 1402, because light that is coupled into the ring resonator 1406 at the top of the ring resonator 1406 travels in a counterclockwise direction toward coupling 1410. Then, the “added” light can enter the first waveguide 1402 through coupling 1410. Both “added” light and light that never entered the ring resonator 1406 and just passed through the first waveguide 1402 can exit the add-drop resonant filter 1400 at an exit port 1403.

The size, e.g., radius, of the add-drop resonant filter 1400 can determine the resonant frequency of the filter. For example, when the circumference of the ring resonator is an integer multiple of a wavelength of light, that wavelengths of light will interfere constructively in the ring resonator 1406, and the power of that wavelengths of light can grow as the light travels through the ring resonator 1406. When the circumference of the ring resonator is not an integer multiple of the wavelengths of light, not wavelengths of light will interfere destructively in the ring resonator 1406, and the power of that wavelengths will not build up in the ring resonator 1406.

The coupling strengths at couplings 1410 and 1412 can determine how much of light within the ring resonator 1406 couples into or out of the ring resonator 1406. For example, the coupling strength can be selected to permit a steady state to build up within the ring resonator 1406 by in-coupling and out-coupling a predetermined percentage of light at specific wavelengths. The coupling strengths at the couplings 1410 and 1412 can depend on the material and geometrical parameters of the add-drop resonant filter 1400. The wavelength dependence on light's behavior at the couplings 1410 and 1412, e.g., whether light enters or exits the ring resonator also depends on the material and geometrical parameters of the add-drop resonant filter 1400.

Designs for add-drop resonant filters 1400 generally balance performance parameters, such as the free spectral range (FSR), the insertion loss (IL) both on- and off-resonance, the filter bandwidth, e.g., full width half max (FWHM), spectral shape, which corresponds to the order of the resonator, susceptibility to intra- and inter-substrate thickness variations, and tuning efficiency. The order of the resonator is the number of ring resonators between the first and second waveguide.

Figure 11B:
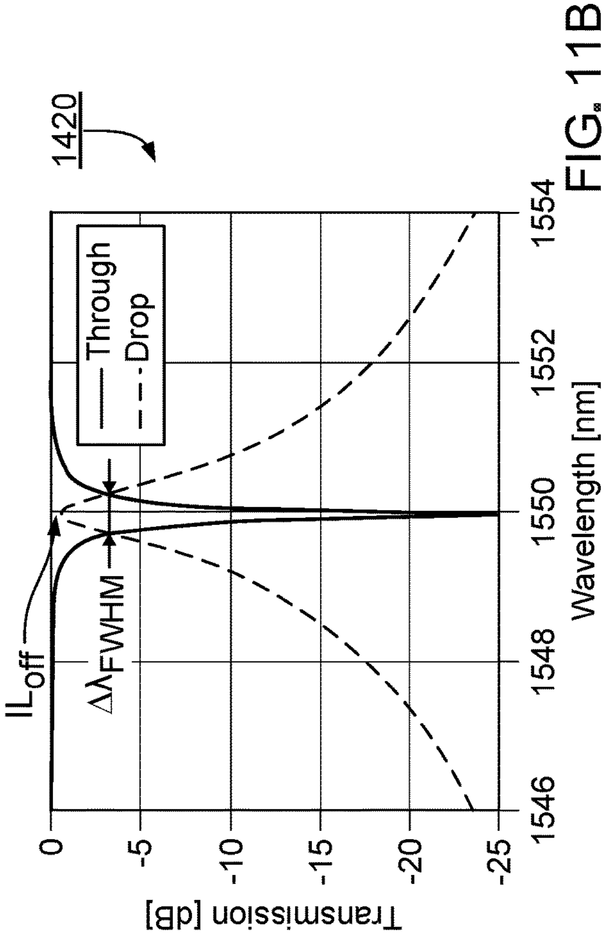
FIGS. 11B and 11C depict plots showing some of the design parameters of add-drop resonant filters.
Figure 11A:
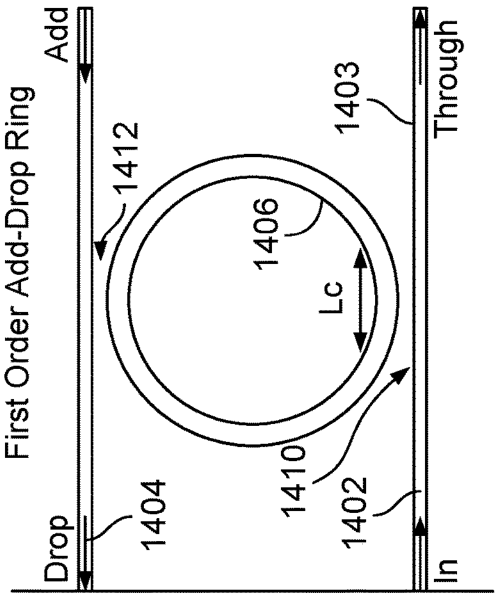
FIG. 11A is a schematic of an add-drop resonant filter.
Figure 11C:
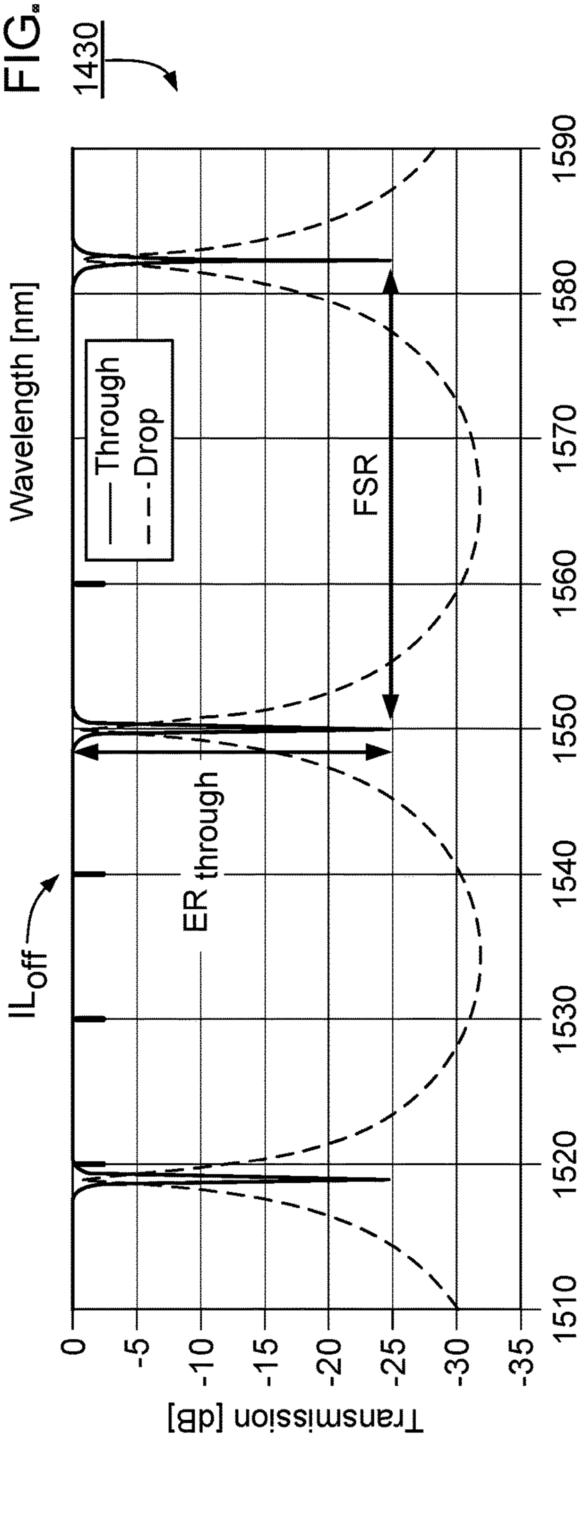

With reference to FIGS. 11B and 11C, the design of add-drop resonant filters affects performance parameters. The solid line in plot 1420 corresponds to the "through" light 1422, and the dotted line corresponds to the "dropped" light 1424 of add-drop resonant filter 1400. The through light 1422 corresponds to light that enters at input port in the first waveguide 1402 and passes through to exit port 1403. The dropped light corresponds to light that enters at an input port in waveguide 1402 and is dropped by the ring resonator 1406 at coupling 1410.

In plot 1420, the transmission of the through light 1422 is generally flat except for a sharply descending drop centered at a resonant frequency, e.g., 1550 nm. The FWHM of the drop is $\Delta\lambda_{FWHM}$. The transmission of the dropped light 1424 is a wide peak starting at a negative value and centered at the resonant frequency. FIG. 11B illustrates how most of the through light 1422 is transmitted through the add-drop resonant filter 1400 except near the resonant frequency, and most of the "dropped" light is at least partially not transmitted except near the resonant frequency. The on-resonant insertion loss $IL_{on}$, e.g., the insertion loss at the resonant frequency, is the difference between the peak of the dropped light 1424 and zero, which represents how much light is not dropped by the ring resonator 1406.

In plot 1430, the through light 1422 and dropped light 1424 is displayed over a wider wavelength range and transmission range. The distance between neighboring pits of the through light 1422 (or the distance between neighboring peaks of the dropped light 1424) is the free spectral range of the add-drop resonant filter 1400. The range in transmission of the through light is the extinction ratio $ER_{through}$. In addition to there being insertion loss on resonance, there is also insertion loss $IL_{off}$ off resonance, which can occur when resonators include tight bends and sharp transitions.

In general, optimizing for one design feature can come at the expense of another design feature, e.g., there are trade-offs between design parameters. For example, increasing the FSR can increase the total number of wavelength channels for a fixed spacing, which can also result in a smaller cross-section of the ring resonator 1406. However, smaller ring resonators can suffer worse insertion loss and reduce the available coupling interaction length $L_c$ and thus the FWHM per channel bandwidth. Additionally, multimode resonators typically have better insertion loss compared to single mood resonators and are more robust given the same fabrication techniques. However, the presence of higher order modes can corrupt the FSR. In some implementations, to reduce the corruption of the FSR, conformal mode selective couplers composed of sharp and narrow S-bends can be used, but the conformal load selective couplers can worsen the off-resonance insertion loss.

Using a conformal coupler with a more gradual, e.g., adiabatic, bend can avoid some of the above-mentioned drawbacks. For example, optimizing for a Figure of Merit (FOM), e.g., FSR, $IL_{on/off}$, and FWHM, for a particular application can result in a robust and efficient device for multiplexing with low insertion loss. The device can be a WDM receiver with a wide FSR and high bandwidth per channel, with low insertion loss per channel, e.g., 0.2 dB or less.

Determining the FOM can include finding a limit for the number of wavelength channels $N_\lambda$ allowed in a WDM system for a cascaded add-drop resonant filter operating over a single resonator FSR. In some implementations, the number of wavelength channels is determined by $N_\lambda$=floor (min(FSR/$\Delta\lambda_{channel}$, $IL_{limit}/IL_{off}$+1)). $\Delta\lambda_{channel}$ is the channel spacing and the wavelength or frequency domain (depending on how FSR is defined), and $IL_{limit}$ is defined as the maximum allowable difference in insertion loss between the first channel in the last channel of the cascaded add-drop resonant filter. In general, determining the FOM includes maximizing FSR and minimizing $IL_{off}$.

An aggregate bandwidth of the given add-drop resonant filter is determined by $N_\lambda$ multiplied by the bandwidth per channel $f_\lambda$. Add-drop resonant filters are configured such that the resonator bandwidth, e.g., FWHM, permits the requisite channel bandwidth around the carrier frequency. In some implementations, increasing the coupling strength between the waveguides and the ring resonator can increase the figure of merit by increasing the channel bandwidth around the carrier frequency.

Reducing the gap between the first and second waveguides 1402 and 1404 and the ring resonator 1406 and increasing the interaction length, e.g., the region where either of the first and second waveguides 1402 and 1404 are sufficiently close to the ring resonator 1406, can increase the coupling strength between the waveguides and the ring resonator. The gap between the first and second waveguides 1402 and 1404 and the ring resonator 1406 is limited by foundry process specifications. Increasingly the interaction length introduces a design trade-off between the resonator path length and thus FSR and the bandwidth per channel $f_\lambda$. To maximize the aggregate bandwidth, as much of the resonator path length should be a part of the coupling regions as possible, which results in a resonator with adiabatic bend geometry.

Figure 12:
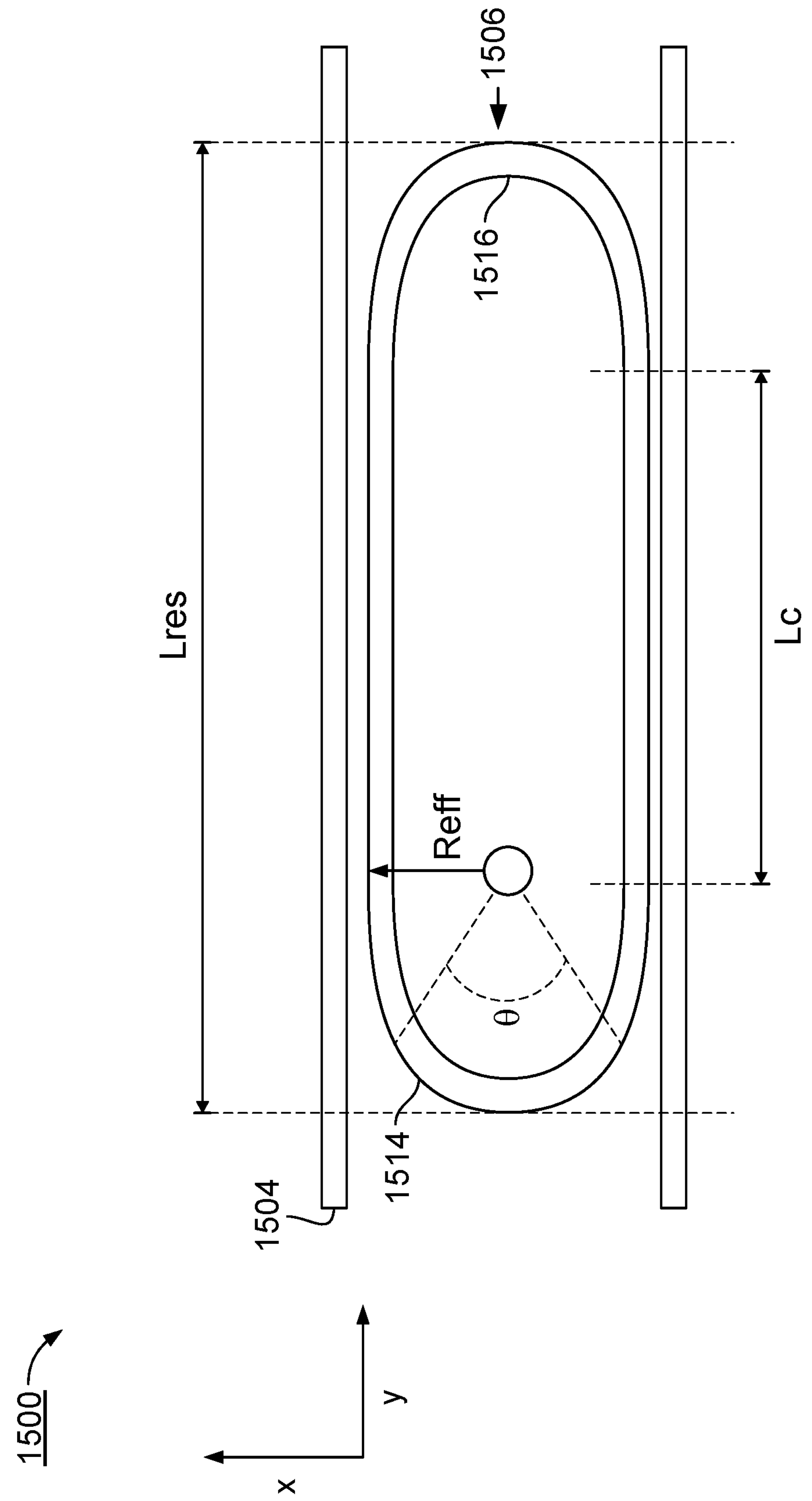
FIG. 12 depicts an example of add-drop filter with adiabatic bend geometry.

With reference to FIG. 12, add-drop filter 1500 has a shape with adiabatic bend geometry, e.g., includes a gradual change in curvature and width. The add-drop filter 1500 includes a first waveguide 1502, a second waveguide 1504, and a racetrack resonator 1506. The racetrack resonator can have a length $L_{res}$ that measures the length of the resonator along the direction of the interaction region 1508, which has a length $L_c$. Compared to a circular ring resonator, which has a relatively short interaction length (see $L_c$ in FIG. 11A) compared to the diameter of the circular ring resonator, the racetrack resonator 1506 has a greater ratio of $L_c/L_{res}$. This increase in ratio can maximize the aggregate bandwidth as mentioned above.

As in the add-drop resonant filter 1400, input light traveling in a first direction can be coupled into the racetrack resonator 1506 from the first waveguide 1502 via a coupling 1510. In-coupled light can travel counterclockwise toward coupling 1512, where some light is dropped by the racetrack resonator 1506 and enters the second waveguide 1504. Light traveling in a second direction opposite to the first direction can be added into the racetrack resonator 1506 through the second waveguide 1504 through coupling 1512. The added light can travel in a counterclockwise direction toward coupling 1510 and be in-coupled into the first waveguide 1502.

The two interaction regions 1508 can be parallel to each of the first and second waveguides 1502 and 1504 and aligned in a vertical direction, e.g., the x direction. The interaction regions 1508 can be connected by two curved portions 1514 and 1516. The distance between the two interaction regions can be characterized by an effective radius $R_{eff}$, which is half of the distance between the two interaction regions 1508.

Figure 13A:
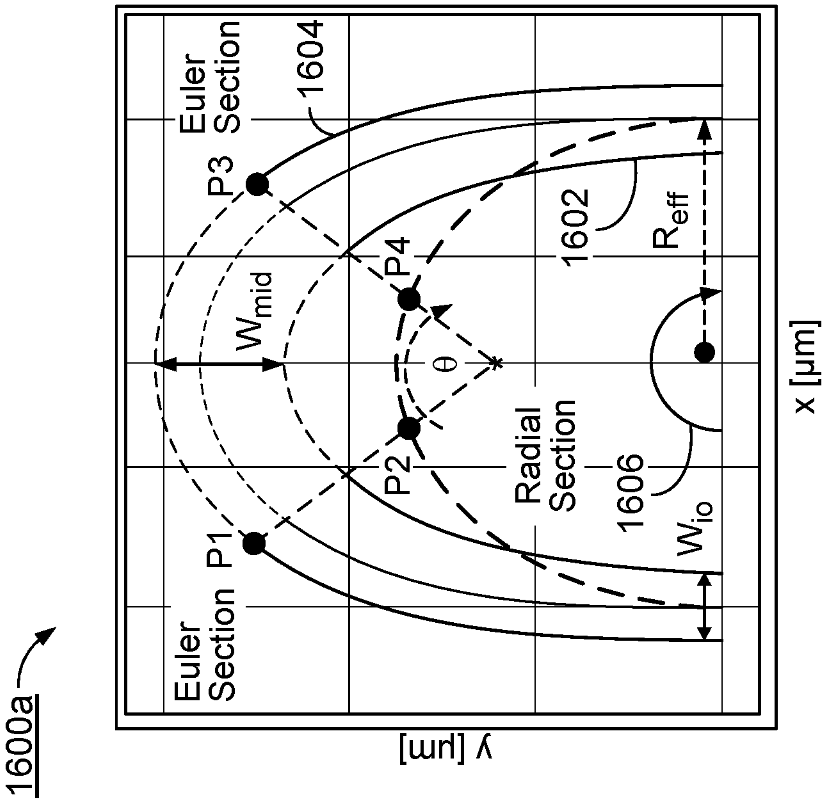
FIGS. 13A and 13B are plots illustrating an example of the underlying bend geometry of a racetrack resonator from FIG. 12.
Figure 13B:
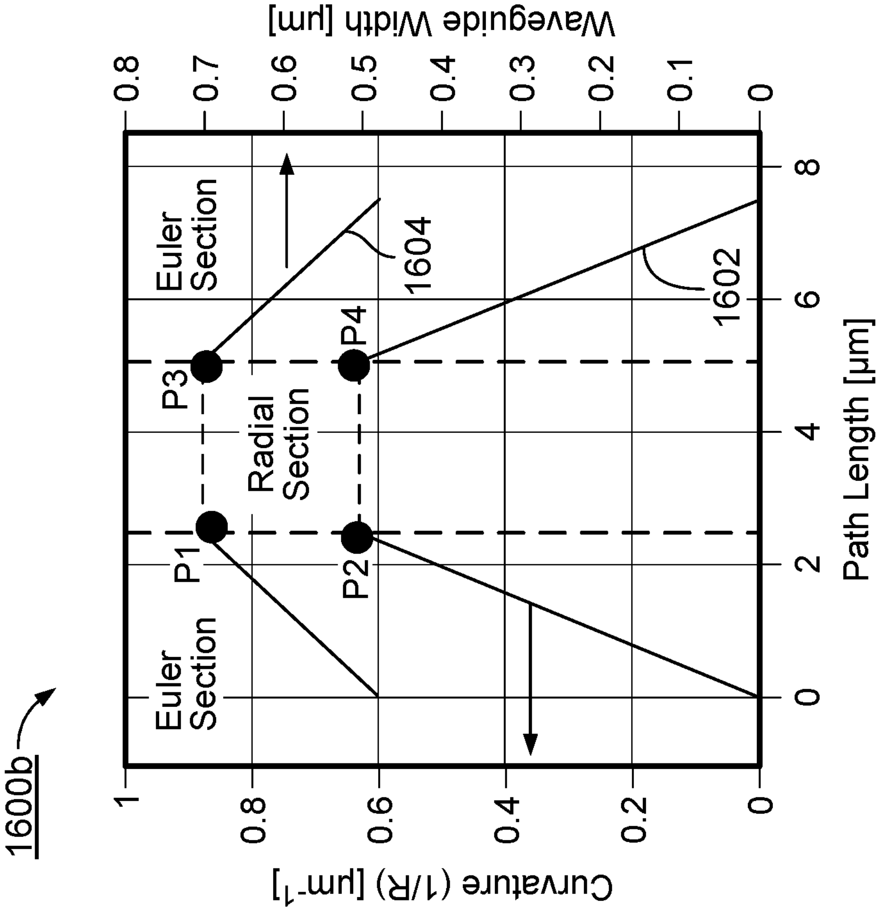

Each of the curved portions 1514 and 1516 has varying radius of curvature, and thus does not form a half of an annulus. The variation of the radius of curvature can be characterized by a bend angle θ. With reference to FIGS. 13A and 13B, plot 1600*a* includes solid lines corresponding to the outlines of the racetrack resonator 1506. The width $w_{io}$ is the minimum width of the interaction region 1508 along the x-axis. The width $w_{mid}$ is the maximum width of the curved portion along the y-axis. In some implementations, the width of the racetrack resonators, e.g., the difference between the inner and outer outlines 1602 and 1604, is nonuniform. The effective radius $R_{eff}$ is marked, indicating the distance between the center of the racetrack resonator 1506 and the center of one of the interaction regions 1508, e.g., halfway along width $w_{io}$.

Plot 1600*b* represents the radius of curvature versus path length for the path of racetrack resonator 1506 represented in FIG. 13A. The radius of curvature of both the inner and outer outlines 1602 and 1604 of the racetrack resonator are plotted. The arrow 1606 indicates the direction and origin (path length=0) of how FIG. 13B is plotted. For most of the path length, the radius of curvature is changing. However, a radial section marked by constant radius of curvature exists in each of the curved portions 1514 and 1516. The areas of changing radius of curvature are called Euler sections. A hybridization ratio is the ratio of the radial path length to the sum of the Euler path lengths.

The radius of curvature changes gradually with respect to the path length in the Euler section, e.g., ±0.1 $micron^{-1}$ or ±0.3 $micron^{-1}$. In some implementations, in the Euler sections, the rate of change in the radius of curvature is constant, e.g., the slope in plot 1600*b* is constant. The width of the Euler sections also gradually changes, e.g., ±0.3 micron. In some implementations, the width of the radial sections is constant, e.g., the radial sections are segments of an annulus.

The locations on each of the inner and outer outlines 1602 and 1604 transition from Euler sections to radius actions are $P_1$, $P_2$, $P_3$, and $P_4$. The same points in FIG. 13B can be mapped $P_1$, $P_2$, $P_3$, and $P_4$ to FIG. 13A. The radial bend angle θ is the angle between a first line passing through points $P_1$ and $P_2$ and a second line passing through $P_3$ and $P_4$. The radial bend must be less than the total bend angle, which is determined by the hybridization ratio of the bend, e.g., the total bend angle can be 180', the radial bend angle θ can be 45°.

The parameters $L_c$, $L_{res}$, $R_{eff}$, and θ can be varied to increase the coupling strength between either or both of or one of the first and second waveguides 1502 and 1504 and the racetrack resonator for various applications. Using a racetrack resonator as described can maximize the ratio $L_c/L_{res}$, create a minimally "wasted," e.g., no coupling, path length on the curved portions 1514 and 1516 while preserving a high quality factor. $L_c/L_{res}$ cannot exceed 1, and in some implementations, the ratio is in a range 1/2-2/3. In some implementations, racetrack resonators provide a maximal trade-off between resonator channel bandwidth and the free spectral range, e.g., total usable optical bandwidth, as well as device insertion loss.

Figure 14:
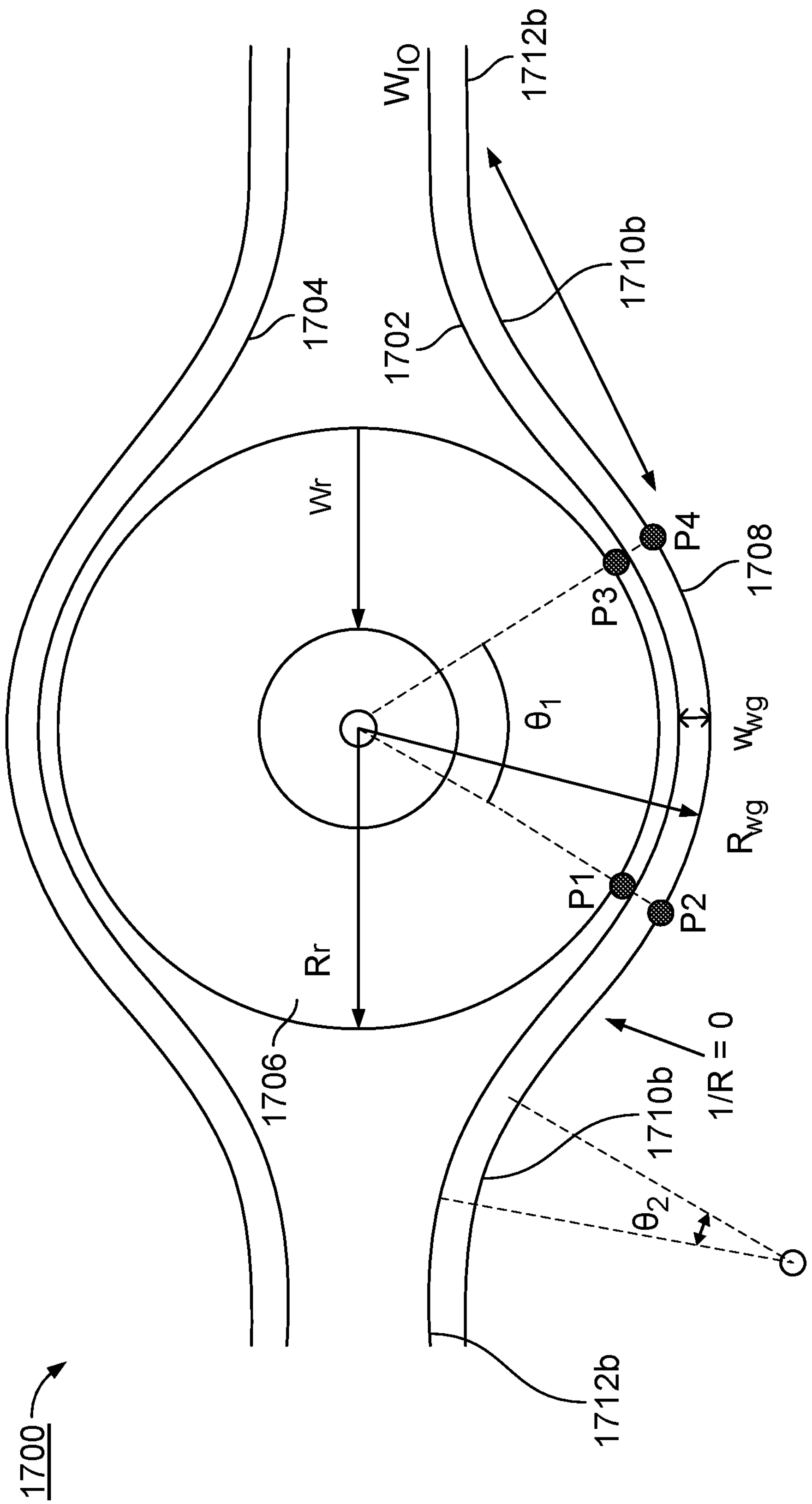
FIG. 14 depicts an add-drop filter with conformal adiabatic coupling geometry with an elliptical eccentricity factor of one.

Another geometrical approach based on adiabatic bends is using a radially conformal coupling region. With reference to FIG. 14, an add-drop filter 1700 has a shape with conformal geometry. The add-drop filters 1700 includes a first waveguide 1702, a second waveguide 1704, and a ring resonator 1706. The ring resonator 1706 can have an annular shape with an outer radius $R_r$ and a width $W_r$ between the inner and outer radii. In some implementations, the outer perimeter of the ring resonator 1706 is elliptical with non-zero eccentricity. The width $W_r$ can range from that of the waveguide 1702 to the radius $R_r$, e.g., a circle. Having a circular ring resonator 1706 can increase the quality factor but can introduce higher modes.

The waveguides 1702 and 1704 can be conformal with, e.g., follow the curve of the ring resonator 1706. For example, a distance between the outer surface of the ring resonator 1706 and the surface of the waveguide 1702 including points $P_1$ and $P_3$ can be constant for at least a portion of the waveguide 1702, e.g., the region between points $P_1$ and $P_3$, e.g., 100 nm to 500 nm depending on desired coupling and foundry minimum gap constraints.

As in the add-drop filter 1500, the amount of the waveguide 1702 that is characterized by having constant radius of curvature can be characterized by a first bend angle $\theta_1$, e.g., 80°, over which the curvature between the waveguide and resonator is conformal/coaxial, which is also where the radius of curvature is minimized for the waveguide.

Each waveguide 1702 and 1704 includes five regions: a central region 1708 centered relative to the ring resonator 1706, outer regions 1710*a* in 1710*b* on each side of the central region 1708, and flat regions 1712*a* and 1712*b*. The radius of curvature is not constant throughout each of waveguide 1702 and 1704. The flat regions 1712*a* and 1712*b* have infinite radius of curvature since flat regions 1712*a* and 1712*b* are straight. Each of outer regions 1710*a* and 1710*b* have adiabatic curvature transition zone, where the waveguide begins to curve. The outer region 1710*a* and 1710*b* can have an S-curved shape, which implies that the curvature changes from positive to negative or vice versa, and the radius of curvature will at least instantaneously be infinite, e.g., 1/R=0. In some implementations, each of the outer regions 1710*a* and 1710*b* also have a region of constant curvature characterized by second bend angle $\theta_2$, which is directly proportional to the first bend angle and the hybridization ratios of the respective adiabatic bend geometries.

In the central region 1708, the radius of curvature is constant. The central region 1708 forms a segment of an annulus concentric, e.g., coaxial, with the ring resonators 1706. The full annulus that would include central region 1708 has an outer radius $R_{wg}$ and a width $W_{wg}$ between the inner and outer radii.

As in the racetrack resonator 1506, there is a region of transitioning from constant to not constant radius of curvature, e.g., radial to Euler sections, in the central region 1708. The locations on each of the top and bottom of the waveguide of transitioning from radial to Euler sections are $P_1$, $P_2$, $P_3$, and $P_4$. The bend angle θ is the angle between a first line passing through points $P_1$ and $P_2$ and a second line passing through $P_3$ and $P_4$. Note that because the ring resonator 1706 is concentric with the annular segment, e.g., central region 1708, the bend angle can be determined with only one of $P_1$ and $P_2$ and only one of $P_3$ and $P_4$, since the first and second lines pass through the origin of the ring resonator 1706 and the width of the central region 1708 is constant.

Using an add-drop filter with conformal geometry, e.g., add-drop filter 1700, can be beneficial for a multimodal resonator that demands precise angular phase matching, e.g., resonators that support multiple modes through interference and phase matching. The described conformal geometry can also lead to reduce device insertion loss, which allows for full spectral utilization of ultra-wide FSR multi-mood geometries that would otherwise be limited by the cumulative insertion loss.

Figure 15A:
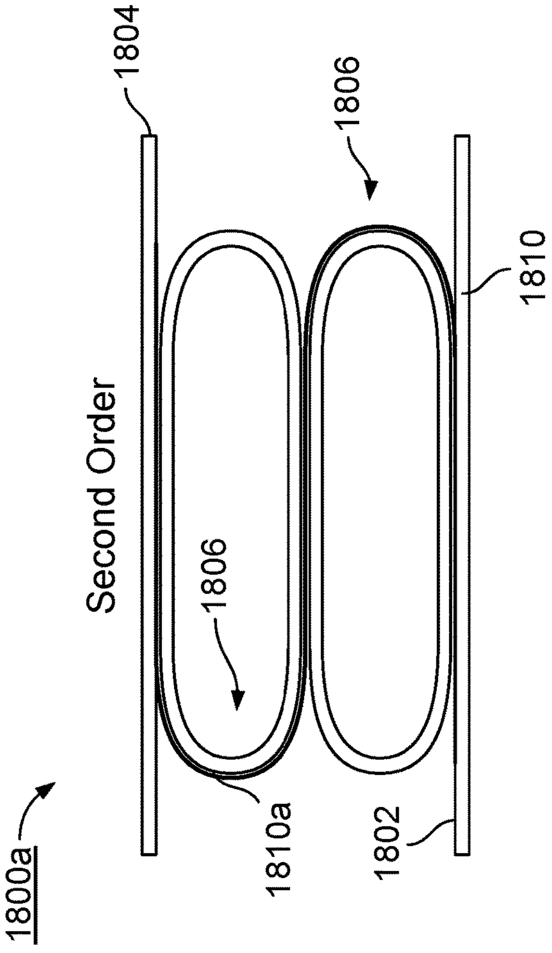
FIGS. 15A and 15B depict second-order, adiabatic add-drop filters with a racetrack and a conformal bend geometry, respectively, with elliptical eccentricity factors greater than one.
Figure 15B:
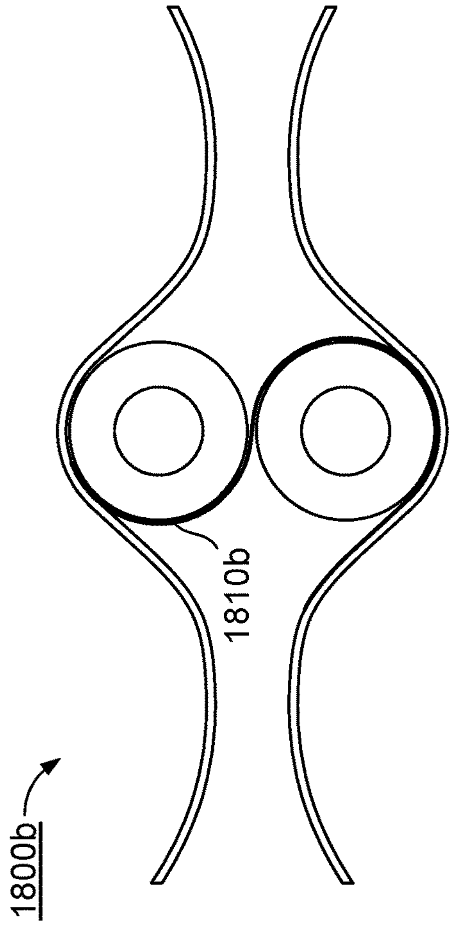

Although FIGS. 12 and 14 depict first-order add-drop filters 1500 and 1700, the design principles from the described adiabatic bend geometry can be applied to higher order modes, as well. With reference to FIGS. 15A and 15B, second-order add-drop filters 1800*a* and 1800*b* have racetrack and conformal band geometries, respectively. As in to the first-order add-drop resonant filter 1400, light can be in-coupled from a first waveguide 1802 into the resonator 1806. However, instead immediately encountering the second waveguide 1804, the light can be coupled into another ring resonator 1808. The direction of light as it passes from one resonator to another switches, e.g., clockwise to counterclockwise or vice versa. Some of the light in the other ring resonator 1808 couples into the second waveguide 1804. Accordingly, the light follows a path 1810*a* marked by the bold line. Because the number of resonators is even, the "through" light is traveling in the same direction as the light at the beginning of the path 1810. Add-drop filter 1800*b* has a similar architecture and also includes a serpentine path 1810*b*.

Although FIGS. 15A and 15B depict two ring resonators, other numbers, e.g., four or five, of resonators as possible. In some implementations, first-order ring resonators can be combined with higher-order ring resonators. For example, one of waveguides 1702 and 1704 from add-drop filter 1700 can connect to one of the waveguides of the add-drop filter 1800*b*.

Figure 15C:
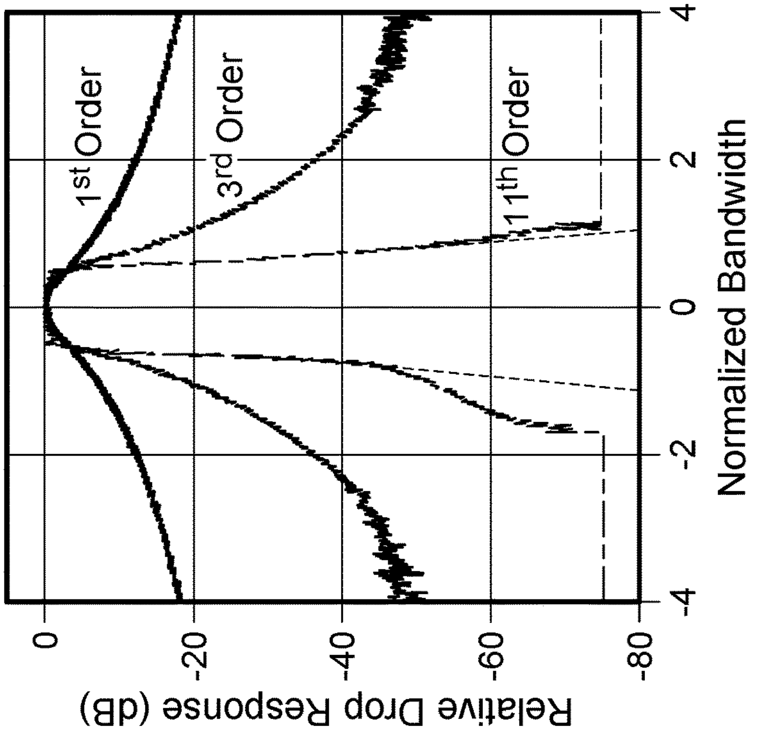
FIG. 15C is a plot of the relative drop response over bandwidth for different order add-drop filters.

In general, higher-order add-drop filters can have more precise output signals. FIG. 15C is a plot 1800*c* of the relative drop response over bandwidth for different order add-drop filters. The higher-order add-drop filters have narrower normalized bandwidths, which allows for denser WDM channels. Because the described racetrack and conformal resonators include 180° turns, the resonators can be stacked and preserve the direction of light travel.

Figure 15D:
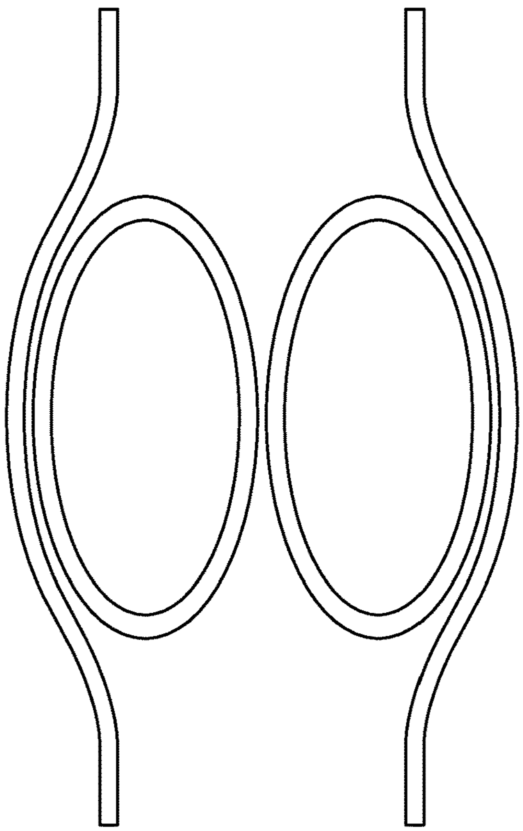
FIG. 15D depicts a second-order, adiabatic add-drop filters with a hybridized geometry.

In some implementations, the geometry of individual ring resonators in an add-drop filter varies. For example, the outer radii of two ring resonators can be the same or different, or the interaction length of two racetrack resonators can be the same or different. With reference to FIG. 15D, one or more ring resonators 1800*d* can have an elliptical eccentricity (between zero and one), functionally hybridizing between the two main geometries. Because a circle is an example of an ellipse, the ring resonators of both FIGS. 14 and 15D have elliptical perimeters.

Although both the adiabatic bend geometries described, e.g., the racetrack and conformal geometries, offer advantages over the conventional ring resonator, in some implementations, one adiabatic bend geometry is preferable. For example, in some implementations, the off-resonance insertion loss is reduced by having a long interaction region 1508 provided by a racetrack resonator and allows for utilization of the full free spectral range, e.g., a four times reduction in off-resonance IL compared to the conformal geometry.

Both the racetrack and conformal geometries permit single or multi-mode waveguides. In general, single mode waveguides allow for larger free spectral ranges, but multimode waveguides tend to allow for more dispersion engineering and improved robustness to fabrication variations. Additionally, multi-mode waveguides are typically designed to avoid exciting higher-order modes. For example, part of the figure of merit can be the transmission for the $TE_0$ mode over a given optical bandwidth.

Figure 16A:
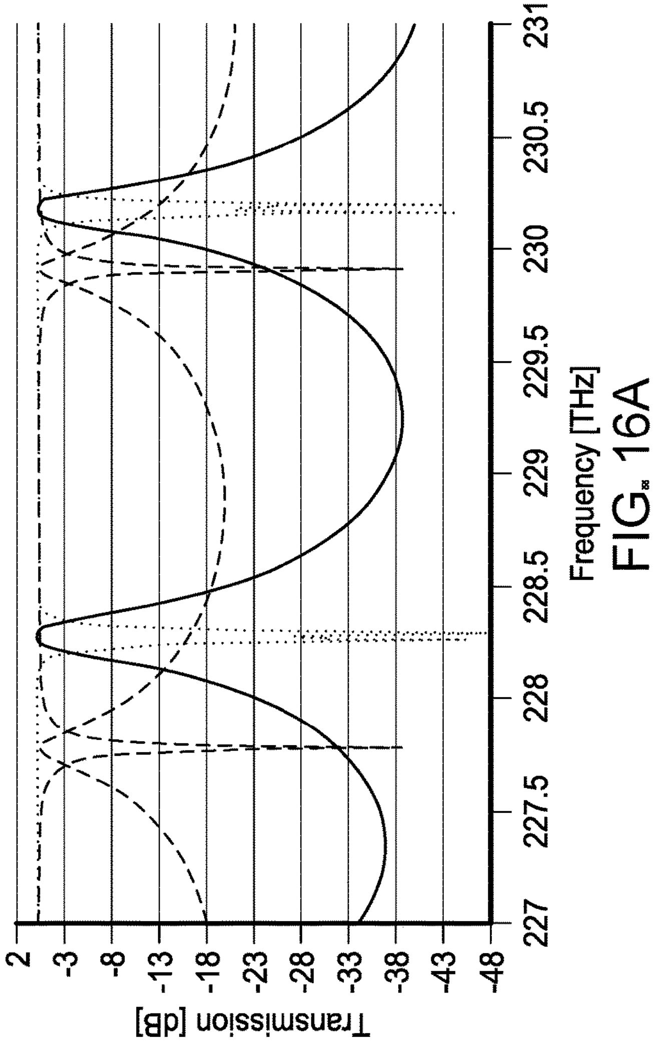
FIGS. 16A, 16B, 16C, and 16D depict plots of simulated transmission results for through and dropped light in first- and second-order resonators.
Figure 16B:
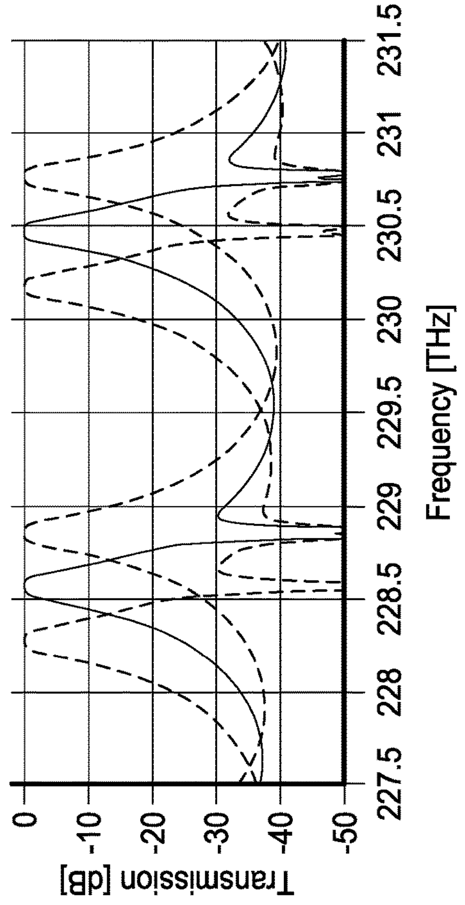
Figure 16C:
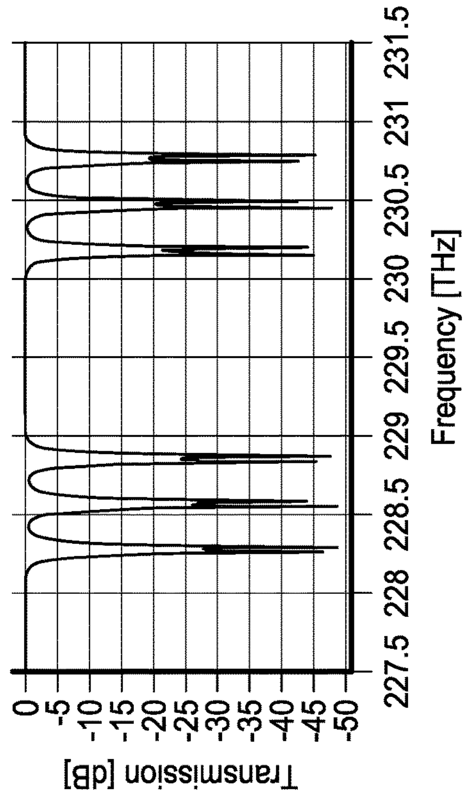

With reference to FIGS. 16A, 16B, and 16C, simulated transmission results for through and dropped light in first- and second-order racetrack resonators are represented in plots 1900*a*, 1900*b*, and 1900*c*. The black lines correspond to the first-order racetrack resonator, and the gray lines correspond to the second-order racetrack resonator. The solid lines correspond to the dropped light, and the dotted lines correspond to the through light. As depicted in plot 1900*a*, the FSR and FWHM of each of the first-order and second-order racetrack resonators are similar. However, the second-order racetrack resonator has a flatter passband, e.g., more of the through light profile is flat, sharper roll-off. Roll-off is the steepness of the slope when leaving the passband, e.g., 1 dB to 10 dB. Additionally, the ER is greater, e.g., the through it has a shallower dip, compared to the first-order racetrack resonator.

In some implementations, the performance of the add-drop filters can depend on the wavelength of light. For example, FIG. 16C depicts the through port after three cascaded second-order resonators. Three different wavelengths represented by the solid, dotted, and dashed lines.

Figure 16D:
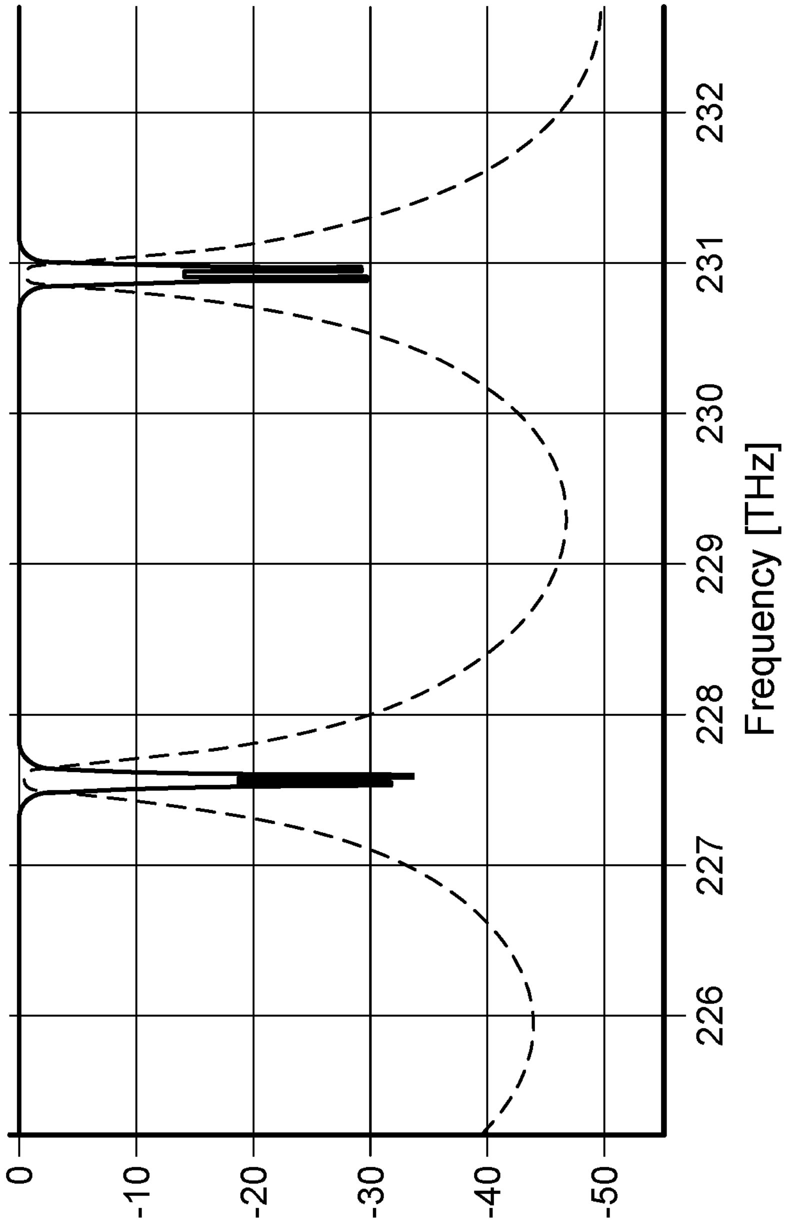

With reference to FIG. 16D, the simulated transmission results for through and dropped light in the device of FIG. 15D are represented in plots 1900*d*. Compared to the simulated transmission results of FIG. 16A, the ER is greater for the conformal geometry resonators compared to the racetrack resonators.

Figure 17B:
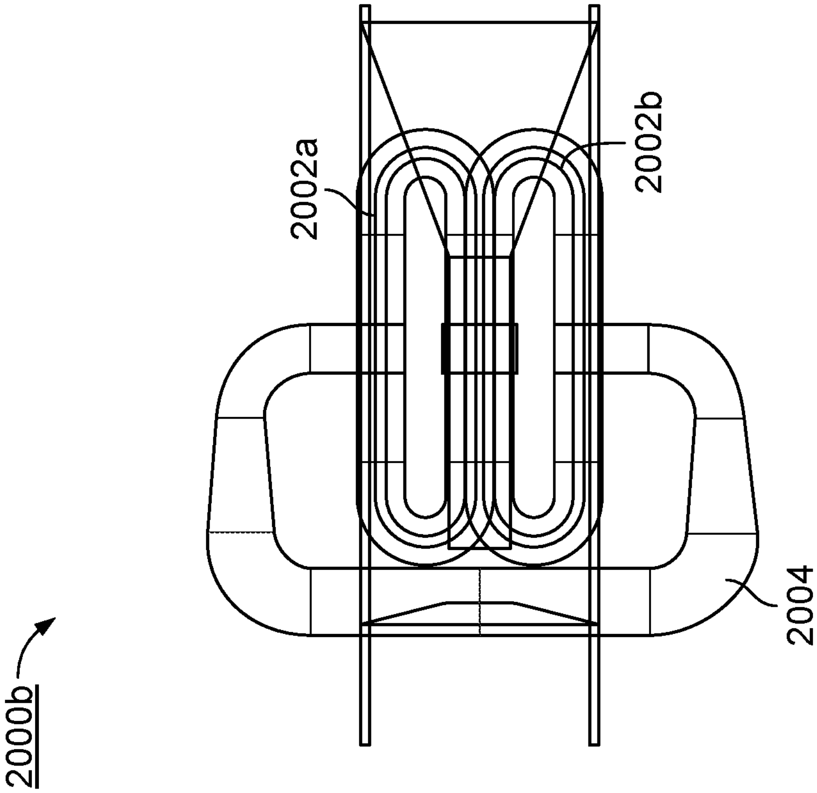
FIGS. 17A and 17B depict higher-order resonators with different heating element configurations.
Figure 17A:
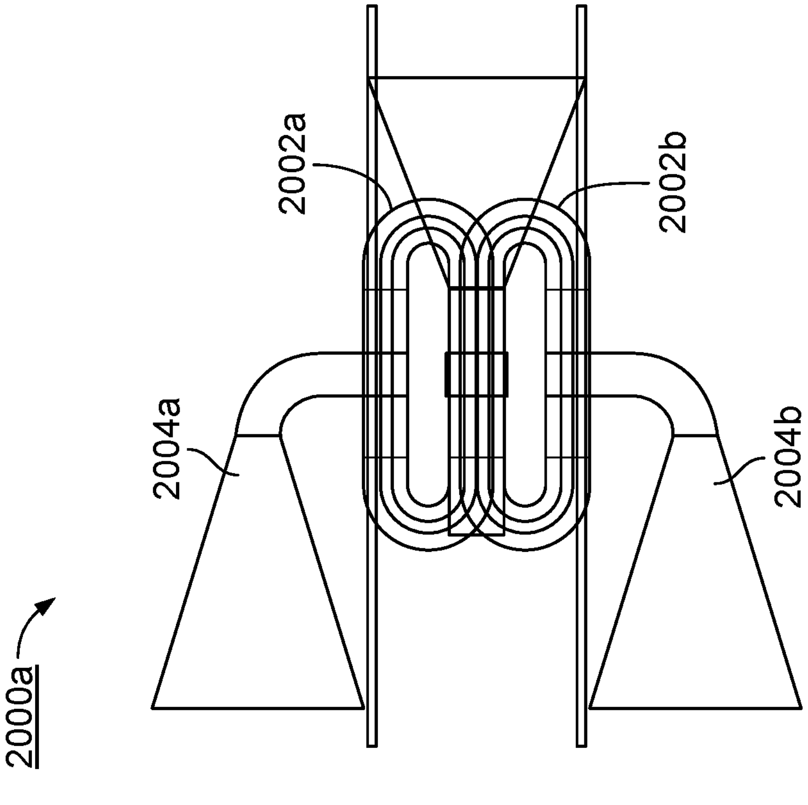

With reference to FIGS. 17A and 17B, higher-order resonators can have different configurations for the heating elements. For example, device 2000*a* includes two ring resonators 2002*a* and 2002*b* each with its own heating element 2004*a* and 2004*b*. Each of heating elements 2004*a* and 2004*b* receive a separate signal from the ECM 105 that controls how much heat each heating element generates. As another example, device 2000*b* includes two ring resonators 2002*a* and 2002*b* that share a joint heating element 2004. The joint heating element 2004 can have a shape that is symmetric with respect to an axis that divides the two ring resonators 2002*a* and 2002*b*, so that there is symmetric heat distribution. In some implementations, using a single joint heater 2004 with multiple resonator rings can reduce complexity when fabricating the device 2000*b*.

Figure 18:
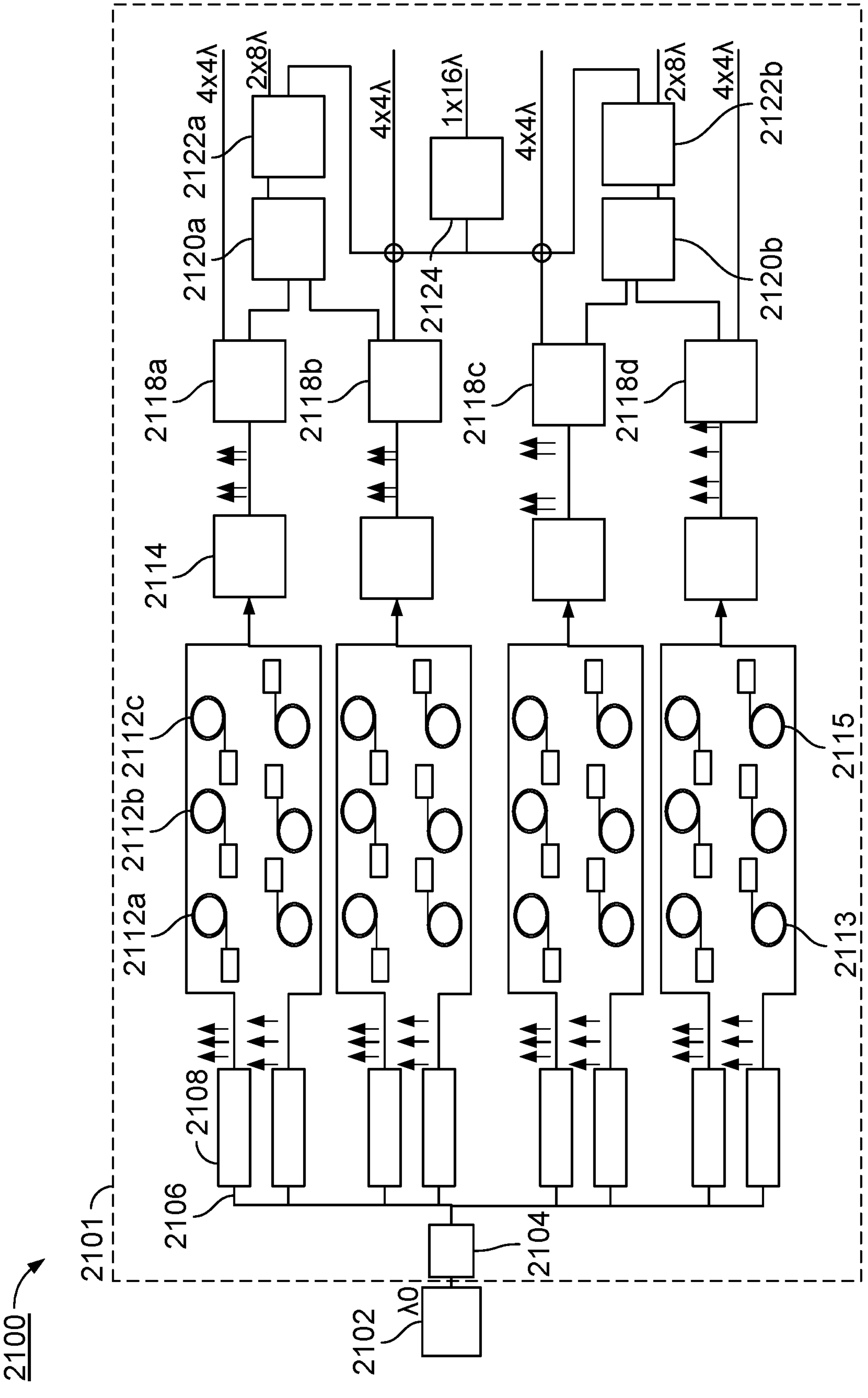
FIG. 18 depicts a reconfigurable optical transmitter on a chip.

With reference to FIG. 18, optical frequency combs as disclosed herein can form a reconfigurable optical transmitter 2100 on a chip 2101, indicated by the dotted line. An off-chip optical source 2102 emits a pump wave. The pump wave is coupled into an eight-way splitter 2104, which divides up the pump wave into eight separate optical paths 2106. Each optical path 2106 couples a portion of the pump wave into a respective optical frequency comb 2108. Each optical frequency comb 2108 generates two new frequencies, e.g., an idler frequency less than the pump frequency and a signal frequency greater than the pump frequency.

The output of five of optical frequency combs 2108, e.g., the pump, signal, and idler waves, follows an optical path 2110 with integrated modulators. The signal wave is modulated by a signal modulator 2112*a*, the idler wave is modulated by an idler modulator 2112*b*, and the pump wave is filtered out by a pump filter 2112*c*. For the sixth optical frequency comb, instead of there being a pump filter, one of the signal or idler waves is filtered out by filter 2113, and a pump modulator 2115 modulates the pump.

A pair of each of the optical paths 2110 merge in a multiplexer 2114, such that two pairs of modulated waves combine in each multiplexer 2114. The combined pairs of modulated waves follow an optical path 2116 to a switch 2118. Each switch 2118 can send the combined pairs along one of two paths.

Switches 2118*a* and 2118*d* are each coupled to one path that directly outputs the four waves. Switches 2118*a* and 2118*d* are each coupled to another path that leads to multiplexers 2120*a* and 2120*b*, respectively. Multiplexers 2120*a* and 2120*b* combine four pairs of modulated waves, e.g., combine eight waves. Switches 2118*b* and 2118*c* are coupled to a first path toward multiplexers 2120*a* and 2120*b* as well as a second path that directly outputs the combined pairs of modulated waves.

The multiplexers 2120*a* and 2120*b* send the eight waves to switches 2122*a* and 2122*b*, respectively. The switches 2122*a* and 2122*b* send the eight waves along either a first path that directly outputs the eight waves or a second path that leads to a multiplexer 2124 that combines two groups of eight waves, e.g., sixteen waves.

In some implementations, the switches are configured such that switches 2118*a*, 2118*b*, 2118*c*, and 2118*d* each send incoming groups of four waves directly to output, e.g., configured as a 4×4λ transmitter. In some implementations, the switches are configured such that switches 2118*a*, 2118*b*, 2118*c*, and 2118*d* each send incoming groups of four waves to a multiplexer 2120*a* or 2120*b*. In some implementations, switches 2122*a* and 2122*b* send incoming groups of eight waves directly to output, e.g., configured as a 2×8λ transmitter. In some implementations, switches 2122*a* and 2122*b* to send incoming groups of eight waves to multiplexer 2124, e.g., configured as a 1×16λ transmitter.

In addition to the embodiments of the attached claims and the embodiments described above, the following embodiments are also innovative.

In general, innovative aspects of the subject matter described in this specification can be embodied in a device that includes: a wavelength generator configured to receive a pump optical signal at a pump frequency at an input port and emit output optical signals from an output port at the pump frequency and at a first frequency and a second frequency both different from the pump frequency, the wavelength generator including: a planar bus waveguide having an input optically coupled to the input port and an output optically coupled to the output port, the planar bus waveguide being configured to guide optical signals at the pump frequency and at the first and second frequencies different from the pump frequency; a main ring resonator including a first non-linear optical material, the main ring resonator being optically coupled to the planar waveguide and having a main ring resonance frequency; a first heating element thermally coupled to the main ring resonator; an auxiliary ring resonator including a second non-linear optical material, the auxiliary ring resonator being optically coupled to the main ring resonator and having an auxiliary ring resonance frequency; and a second heating element thermally coupled to the auxiliary ring resonator, the first and second heating elements being independently variable; and an electronic control module in communication with the first heating element and the second heating element, the electronic control module being programmed to control a detuning of the main ring resonance frequency from the pump signal frequency via the first heating element, and to control a spectral position of the auxiliary ring resonance frequency to produce optical signals at the first and second frequencies from the optical signal at the pump frequency.

Another general aspect can be embodied in an optical filter that includes: a first planar waveguide extending in a plane, the first planar waveguide being configured to guide optical signals at a first frequency and a second frequency; and a first ring resonator extending in the plane, the first ring resonator being optical coupled to the first planar waveguide at a first location, the first ring resonator including a pair of curved portions, each curved portion including a pair of Euler sections each having a width that varies along a length of the respective Euler section and a radial section having a constant width between the pair of Euler sections, the ring resonator being configured to selectively couple the optical signal at a first frequency from the first planar waveguide into the ring resonator relative to the optical signal at the second frequency to filter the first frequency from the optical signals guided in the first planar waveguide.

Another general aspect can be embodied in an optical filter that includes: a first ring resonator extending in a plane having an elliptical perimeter with a radius of curvature and elliptical eccentricity; and a first planar waveguide extending in the plane, the first planar waveguide being configured to guide optical signals at a first frequency and a second frequency, the first ring resonator being optical coupled to the first ring resonator along a first length of the first planar waveguide, the first planar waveguide having a curvature along the first length such that a distance between the first planar waveguide and the first ring resonator is constant along the first length, the first ring resonator being configured to selectively couple the optical signal at a first frequency from the first planar waveguide into the ring resonator relative to the optical signal at the second frequency to filter the first frequency from the optical signals guided in the first planar waveguide.

These and other implementations can each optionally include one or more of the following features.

In some implementations, the planar bus waveguide, the main ring resonator, the auxiliary ring resonator, and the first and second heating elements are integrated into a common photonic integrated circuit.

In some implementations, the first frequency is higher than the pump frequency and the second frequency is lower than the pump frequency.

In some implementations, the electronic control module is programmed to vary the first and second heating elements to modify phase matching conditions between the main ring and the auxiliary ring so that the first and second frequencies correspond to a first desired frequency and a second desired frequency, respectively, within a range of possible frequencies.

In some implementations, the electronic control module is programmed to vary the first and second heating elements to modify phase matching conditions between the main ring and the auxiliary ring so that the first and second frequencies correspond to a first desired frequency and a second desired frequency, respectively, within a range of possible frequencies.

In some implementations, the first wavelength generator and the second wavelength generator are integrated into a photonic integrated circuit.

In some implementations, the wavelength generator is a first wavelength generator and the device further includes a second wavelength generator configured to receive an optical signal at least one of the pump frequency, the first frequency, and the second frequency from the first wavelength generator, the second wavelength generator being configured to emit output optical signals at least a third frequency and a fourth frequency both different from the pump frequency, the first frequency, and the second frequency.

In some implementations, the device further includes a demultiplexer arranged to receive the optical signals at the pump frequency, at the first frequency, and at the second frequency from the first wavelength generator, and to direct the optical signal at the pump frequency and the first frequency into a first waveguide and the optical signal at the second frequency into a second waveguide. The first or second waveguides can correspond to a second planar bus waveguide of the second wavelength generator.

In some implementations, the second or first waveguides correspond to a third planar bus waveguide of a third wavelength generator configured to produce optical signals at third and fourth frequencies different from the pump frequency and the first and second frequencies.

In some implementations, the first, second, and third wavelength generators and the demultiplexer are integrated into a photonic integrated circuit.

In some implementations, the device further includes first signal modulators arranged to receive output from the first wavelength generator and second signal modulators arranged to receive the output from the second wavelength generator, the first signal modulators being configured to modulate the optical signals at the first frequency and the second frequency and the second signal modulators being configured to modulate the optical signals at the third frequency and the fourth frequency.

In some implementations, the device further includes a first optical filter and a second optical filter, the first and second optical filters being configured to filter optical signals at the pump frequency from the output of the first and second wavelength generators, respectively.

In some implementations, the device further includes a multiplexer arranged to receive modulated optical signals at the first, second, third, and fourth frequencies from the first and second optical modulators and to output a multiplexed optical signal including the modulated optical signals.

In some implementations, the device further includes an optical switch arranged to receive the multiplexed optical signal from the multiplexer and selective direct the multiplexed optical signal to a device output port or to a second multiplexer for multiplexing with additional optical signals.

In some implementations, the first and second wavelength generators, the first and second signal modulators, the first and second optical filters, the multiplexer, and the optical switch are integrated into a photonic integrated circuit.

In some implementations, the device further includes a pump laser arranged to deliver the pump optical signal to the photonic integrated circuit.

In some implementations, the photonic integrated circuit further includes additional lasers each arranged to receive the pump optical signal and generate optical signals at two additional frequencies.

In some implementations, the photonic integrated circuit is configured to output modulated optical signals at least 16 different frequencies from the pump optical signal.

In some implementations, the modulated optical signals are emitted by the photonic integrated circuit at a single output port.

In some implementations, the modulated optical signals are emitted by the photonic integrated circuit from more than one output port.

In some implementations, the ring resonator further including a pair of straight portions between the pair of curved portions.

In some implementations, the first location corresponds to one of the straight portions.

In some implementations, the optical filter further includes a heating element thermally coupled to the ring resonator and electronic control module in communication with the heating element, the electronic control module being programmed to control an optical path length of the ring resonator to vary the filtering of the first frequency from the optical signals guided in the first planar waveguide.

In some implementations, the optical filter further includes a second planar waveguide extending in the plane, the second planar waveguide being optically coupled to the ring resonator at a second location.

In some implementations, the second location is on an opposite side of the ring resonator from the first location.

In some implementations, the ring resonator is configured to selectively couple the optical signal at the first frequency from the first planar waveguide into the second planar waveguide.

In some implementations, the optical filter further includes a second ring resonator extending in the plane, the second ring resonator being optical coupled to the first ring resonator at a second location.

In some implementations, the second ring resonator includes a second pair of curved portions, each curved portion including a second pair of Euler sections each having a width that varies along a length of the respective Euler section and a second radial section having a constant width between the second pair of Euler sections.

In some implementations, a width of the first planar waveguide is less than a width of the first ring resonator.

In some implementations, the first planar waveguide includes a pair of s-curves, the first length of the first planar waveguide extending across the pair of s-curves.

In some implementations, the optical filter further includes a heating element thermally coupled to the first ring resonator and electronic control module in communication with the heating element, the electronic control module being programmed to control an optical path length of the first ring resonator to vary the filtering of the first frequency from the optical signals guided in the first planar waveguide.

In some implementations, the optical filter further includes a second planar waveguide extending in the plane, the second planar waveguide being optically coupled to the first ring resonator at a second location.

In some implementations, the second planar waveguide is optically coupled to the first ring resonator along a second length of the second planar waveguide, the second planar waveguide having a curvature along the second length such that a distance between the second planar waveguide and the first ring resonator is constant along the second length.

In some implementations, the second length is on an opposite side of the first ring resonator from the first length.

In some implementations, the first ring resonator is configured to selectively couple the optical signal at the first frequency from the first planar waveguide into the second planar waveguide.

In some implementations, the optical filter further includes a second ring resonator extending in the plane, the second ring resonator being optically coupled to the first ring resonator at a second location.

In some implementations, the second ring resonator has an elliptical perimeter with a second radius of curvature.

In some implementations, the second radius of curvature is the same as the radius of curvature of the first ring resonator.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A device, comprising:

a wavelength generator configured to receive a pump optical signal at a pump frequency at an input port and emit output optical signals from an output port at the pump frequency and at a first frequency and a second frequency both different from the pump frequency, the wavelength generator comprising:

a planar bus waveguide having an input optically coupled to the input port and an output optically coupled to the output port, the planar bus waveguide being configured to guide optical signals at the pump frequency and at the first and second frequencies different from the pump frequency;

a main ring resonator comprising a first non-linear optical material, the main ring resonator being optically coupled to the planar waveguide and having a main ring resonance frequency;

a first heating element thermally coupled to the main ring resonator;

an auxiliary ring resonator comprising a second non-linear optical material, the auxiliary ring resonator being optically coupled to the main ring resonator and having an auxiliary ring resonance frequency;

a second heating element thermally coupled to the auxiliary ring resonator, the first and second heating elements being independently variable; and an electronic control module in communication with the first heating element and the second heating element, the electronic control module being programmed to:

control a detuning of the main ring resonance frequency from the pump frequency via the first heating element, control a spectral position of the auxiliary ring resonance frequency to produce the optical signals at the first and second frequencies from the optical signal at the pump frequency, receive first and second target frequencies, and vary the first and second heating elements to modify phase matching conditions between the main ring resonator and the auxiliary ring resonator so that the first and second frequencies correspond to the first and second target frequencies.

2. The device of claim 1, wherein the planar bus waveguide, the main ring resonator, the auxiliary ring resonator, and the first and second heating elements are integrated into a common photonic integrated circuit.

3. The device of claim 1, wherein the first frequency is higher than the pump frequency and the second frequency is lower than the pump frequency.

4. The device of claim 1, wherein the wavelength generator is a first wavelength generator, and the device further comprises a second wavelength generator configured to receive the pump optical signal at the pump frequency at the input port and emit output optical signals at the pump frequency and at a third frequency and a fourth frequency both different from the pump frequency, the first frequency, and the second frequency.

5. The device of claim 4, wherein the first wavelength generator and the second wavelength generator are integrated into a photonic integrated circuit.

6. The device of claim 4, further comprising a first plurality of signal modulators arranged to receive output from the first wavelength generator and a second plurality of signal modulators arranged to receive the output from the second wavelength generator, the first plurality of signal modulators being configured to modulate the optical signals at the first frequency and the second frequency and the second plurality of signal modulators being configured to modulate the optical signals at the third frequency and the fourth frequency.

7. The device of claim 6, further comprising a first optical filter and a second optical filter, the first and second optical filters being configured to filter optical signals at the pump frequency from the output of the first and second wavelength generators, respectively.

8. The device of claim 7, further comprising a multiplexer arranged to receive modulated optical signals at the first, second, third, and fourth frequencies from the first and second pluralities of signal modulators and to output a multiplexed optical signal comprising the modulated optical signals.

9. The device of claim 8, further comprising an optical switch arranged to receive the multiplexed optical signal from the multiplexer and selectively direct the multiplexed optical signal to a device output port or to a second multiplexer for multiplexing with additional optical signals.

10. The device of claim 1, wherein the wavelength generator is a first wavelength generator and the device further comprises a second wavelength generator configured to receive an optical signal at least one of the pump frequency, the first frequency, and the second frequency from the first wavelength generator, the second wavelength generator being configured to emit output optical signals at least a third frequency and a fourth frequency both different from the pump frequency, the first frequency, and the second frequency.

11. The device of claim 10, further comprising a demultiplexer arranged to receive the optical signals at the pump frequency, at the first frequency, and at the second frequency from the first wavelength generator, and to direct the optical signal at the pump frequency and the first frequency into a first waveguide and the optical signal at the second frequency into a second waveguide, wherein the first or second waveguides correspond to a second planar bus waveguide of the second wavelength generator.

12. The device of claim 11, wherein the second or first waveguides correspond to a third planar bus waveguide of a third wavelength generator configured to produce optical signals at third and fourth frequencies different from the pump frequency and the first and second frequencies.

13. The device of claim 12, wherein the first, second, and third wavelength generators and the demultiplexer are integrated into a photonic integrated circuit.

14. The device of claim 9, wherein the first and second wavelength generators, the first and second plurality of signal modulators, the first and second optical filters, the multiplexer, and the optical switch are integrated into a photonic integrated circuit.

15. The device of claim 14, further comprising a pump laser arranged to deliver the pump optical signal to the photonic integrated circuit.

16. The device of claim 15, wherein the photonic integrated circuit further comprises additional lasers each arranged to receive the pump optical signal and generate optical signals at two additional frequencies.

17. The device of claim 15, wherein the photonic integrated circuit is configured to output modulated optical signals at least 16 different frequencies from the pump optical signal.

18. The device of claim 17, wherein the modulated optical signals are emitted by the photonic integrated circuit at a single output port.

19. The device of claim 17, wherein the modulated optical signals are emitted by the photonic integrated circuit from more than one output port.

* * * * *